US012749151B2

(12) United States Patent
Ja

(10) Patent No.: US 12,749,151 B2
(45) Date of Patent: Sep. 29, 2026

(54) SYSTEMS AND METHODS FOR MAXIMUM CONTRAST PROJECTION

(71) Applicant: ARACELI BIOSCIENCES INC., Tigard, OR (US)

(72) Inventor: Shiou-jyh Ja, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 543 days.

(21) Appl. No.: 18/314,697

(22) Filed: May 9, 2023

(65) Prior Publication Data

US 2024/0378697 A1 Nov. 14, 2024

(51) Int. Cl.

*G06T 5/50* (2006.01)
*G06T 7/174* (2017.01)
*G06V 20/69* (2022.01)

(52) U.S. Cl.

CPC ................ *G06T 5/50* (2013.01); *G06T 7/174* (2017.01); *G06V 20/69* (2022.01); *G06T 2207/10056* (2013.01); *G06T 2207/20021* (2013.01)

(58) Field of Classification Search

CPC . G06T 2207/10056; G06T 2207/20021; G06T 5/50; G06T 7/174; G06V 20/69
See application file for complete search history.

(56) References Cited

U.S. PATENT DOCUMENTS

2007/0069106 A1* 3/2007 Krief .......................... G06T 5/50 250/201.3
2011/0249910 A1* 10/2011 Henderson ........... G06V 10/993 382/278
2015/0153559 A1* 6/2015 Sato ..................... H04N 13/395 348/79
2019/0353885 A1 11/2019 Siebenmorgen
2022/0101511 A1* 3/2022 Emtman .............. G01B 11/005

FOREIGN PATENT DOCUMENTS

CN 112367447 A 2/2021
EP 2671113 B1 12/2021
JP 2014029460 A 2/2014

OTHER PUBLICATIONS

Brenner J. et al., "An Automated Microscope for Cytologic Research a Preliminary Evaluation," The Journal of Histochemistry and Cytochemistry, vol. 24, No. 1, Jan. 1976, 12 pages (Year: 1976).*

(Continued)

*Primary Examiner* — Matthew C Bella
*Assistant Examiner* — Janice E. Vaz
(74) *Attorney, Agent, or Firm* — McCoy Russell LLP

(57) ABSTRACT

Methods and systems are provided herein for maximum contrast projection (MCP). In one example, a method includes dividing image data into a plurality of tiles and a plurality of sub-z-stacks, wherein the image data includes a plurality of z-plane images; determining a tile of a plurality of the plurality of sub-z-stacks with a highest local contrast via calculation of a Brenner gradient value for each tile and generation of a Brenner gradient distribution for each of the plurality of the plurality of sub-z-stacks; and projecting pixels of the tile with the highest local contrast for each of the plurality of the plurality of sub-z-stacks to an MCP image.

17 Claims, 10 Drawing Sheets

(56) References Cited

OTHER PUBLICATIONS

Brenner, J. et al., "An Automated Microscope for Cytologic Research a Preliminary Evaluation," The Journal of Histochemistry and Cytochemistry, vol. 24, No. 1, Jan. 1976, 12 pages.
"Maximum intensity projection," Wikipedia Website, Available Online at https://en.wikipedia.org/wiki/Maximum_intensity_projection, Available as Early as Mar. 2, 2006, 2 pages.
Sauer, J., "MaxContrastProjection: Perform a maximum contrast projection of 3D images along the z-dimension into 2D," Bioconductor, Available Online at https://web.archive.org/web/20200225123255/https://bioconductor.org/packages/release/bioc/vignettes/MaxContrastProjection/inst/doc/MaxContrastProjection.pdf, Oct. 29, 2019, 6 pages.
ISA Korean Intellectual Property Office, International Search Report Issued in Application No. PCT/US2024/028634, Aug. 30, 2024, WIPO, 4 pages.

* cited by examiner

SYSTEMS AND METHODS FOR MAXIMUM CONTRAST PROJECTION

TECHNICAL FIELD

Embodiments of the subject matter disclosed herein relate to image projection, and more specifically maximum contrast projection.

BACKGROUND AND SUMMARY

Image data often includes multiple two dimensional (2D) images stacked on top of one another. A variety of methods for aggregating multiple 2D images into a single image are available. Maximum intensity projection (MIP) is the most widely used method, whereby pixels or voxels that have the highest (e.g., maximum) intensity for a given stack of pixels along a z-axis (e.g., a z-stack) is projected to the final image. MIPs, and other 2D projections including minimum intensity projections (MinIPs) and average intensity projections (AIPs), allow for disparate information in image data to be viewed on a single 2D image.

MIP, and other methods for aggregating multiple images to a single image, may have various drawbacks depending on setting. For example, in wide-field microscopy, 2D images of image data may be obtained at different object distances along a z-axis, resulting in images with variable focus wherein some images are sharply focused and other images are blurry. Blurred details may have a higher intensity value at supposedly dark background pixels than sharply focused details. As a result, a MIP image may have erroneously high background intensity values around biostructures, resulting in a "halo" effect. The halo effect from the high background intensity may reduce contrast of the final image and therefore result in degraded image quality.

The inventors herein have recognized the aforementioned issues and present methods and systems that at least partially address these issues. A method for maximum contrast projection (MCP) is herein provided that reduces the aforementioned halo effect and decreases image quality. In one example, each z-plane image of an image dataset is partitioned into a plurality of image tiles and sub-z-stacks, wherein each sub-z-stack includes a tile for each z coordinate. The image data may therefore include a plurality of sub-z-stacks that include a plurality of tiles with the same x,y-coordinate. Using a Brenner gradient calculation, a Brenner gradient value may be determined for each tile in a z-stack of tiles for a specified z-coordinate. The Brenner gradient values determined for the stack of tiles may be plotted as a gradient distribution and a peak value may be correspond to a tile with the highest contrast. The tile with the highest contrast for that specific z coordinate may be projected onto a final projection image. In this way, the method provided herein may provide the best contrast content while reducing the halo effect from the out-of-focus emitter and image degradation by avoiding erroneously high intensity pixels across tiles as a result of variation in focus.

Further, for background areas where structures are not present in the image data or in areas where signal-to-noise ratios are poor, a Brenner gradient distribution generated for a corresponding z-stack may not include a defined peak. Therefore selection of which tile to project from the corresponding z-stack may be random, resulting in a patchy image. Background area mitigation by way of a nearest neighbor interpolation algorithm may be included in the method reduce patchiness in such background areas wherein determination of which background tiles to project is based on surrounding tiles, achieving a smooth intensity transition.

Further, an object-oriented MCP method is also disclosed. The MCP method includes image segmentation to detect objects or structures of interest therein. A set of structure tiles may be defined for each detected structure of interest, as opposed to uniformly sized tiles as described above, may then undergo local contrast evaluation using a Brenner gradient distribution similar to as described above. Projected structure tiles may replace a prior projected uniform tiles in a final MCP image. In this way, local contrasts may be defined particular to structures or objects of interest within the 3D image data rather than defining contrasts for tiles that include a portion of an object of interest.

Further, a multi-plane MCP method may be employed for image data that includes multiple structures of interest within a single z-stack. In some examples, multiple structures of interest may have the same x,y-coordinate but different z-coordinates, resulting in a Brenner gradient distribution with multiple peaks. In such examples, the multi-plane MCP method may generate a final MCP image using one of various merging schemes for z-stacks with multiple structures of interest. The various merging schemes may include projecting pixels from relevant tiles based on maximum intensity value, projecting a weighted average pixel intensity wherein weighting is based on z-coordinate or Brenner gradient value, and inclusion of additional z-plane data from tiles that meet or exceeds a threshold Brenner gradient value. In this way, multiple structures within the same z-stack may be represented in a final MCP image. For example, projection of a weighted average pixel intensity based on z-coordinate may demonstrate spatial distance (e.g., depth) information while projection of a weighted average pixel intensity based on Brenner gradient value may put stress on an object within a z-stack that has a higher local contrast.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
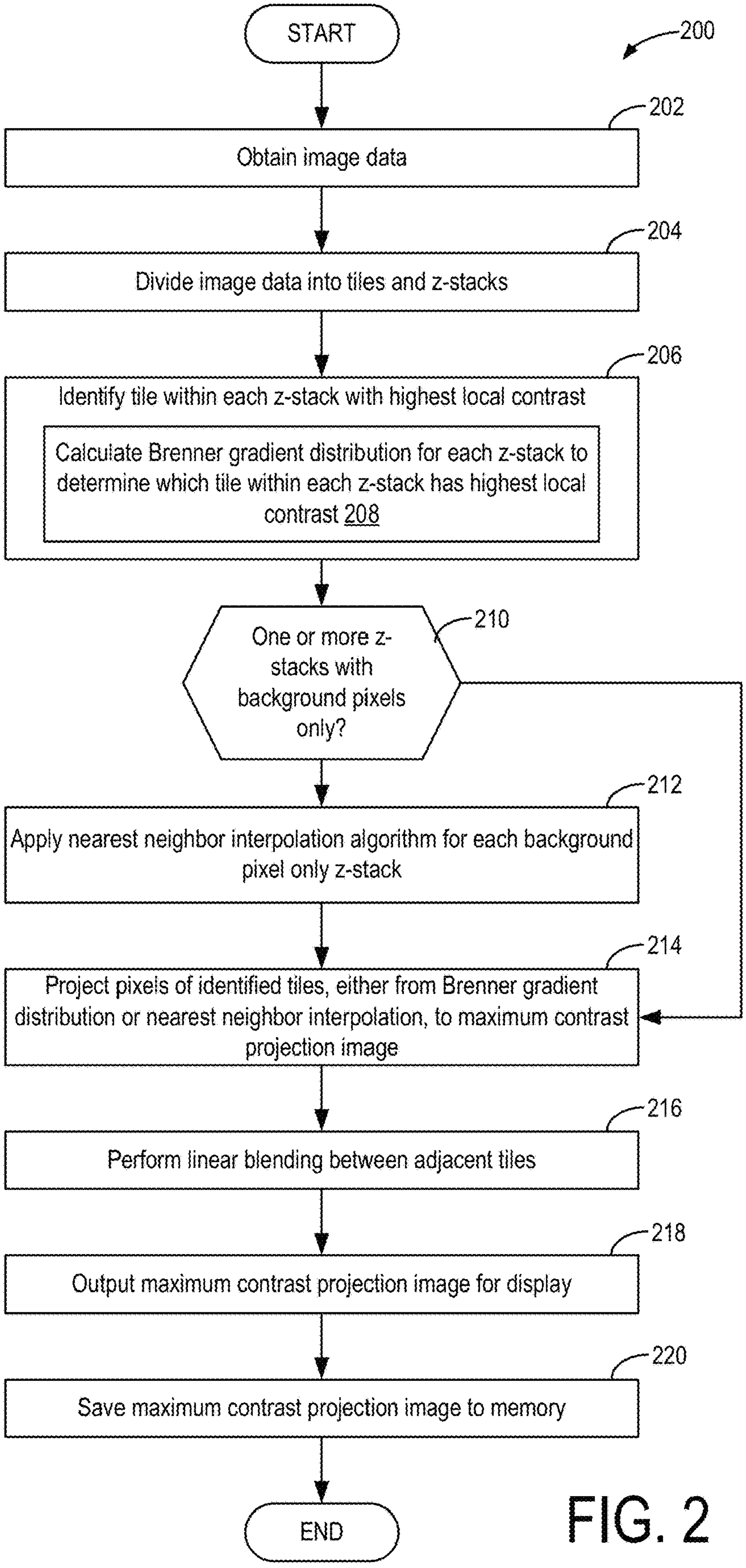
FIG. 2 shows a flowchart illustrating a method for generating a maximum contrast projection (MCP) from image data.
Figure 3:
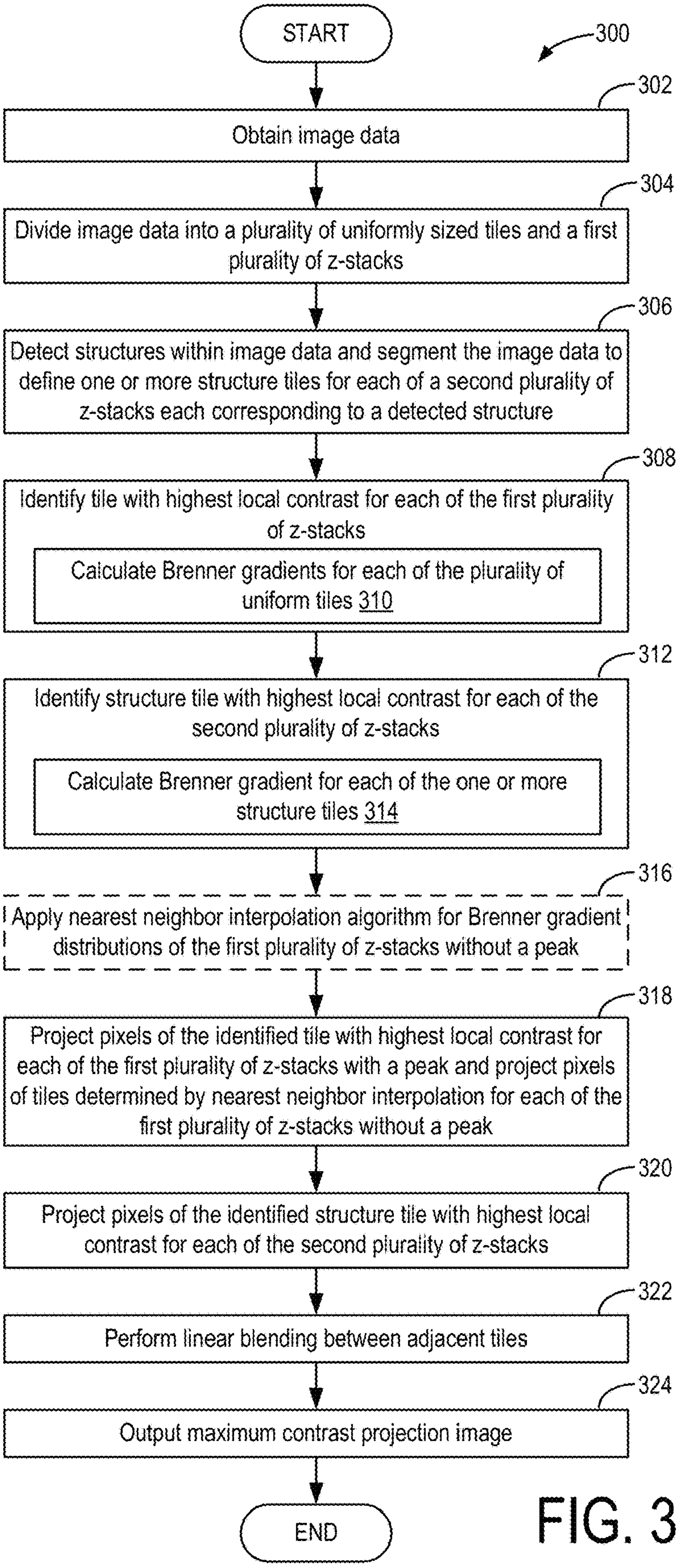
FIG. 3 shows a flowchart illustrating a method for generating an object-oriented MCP from image data.
Figure 4:
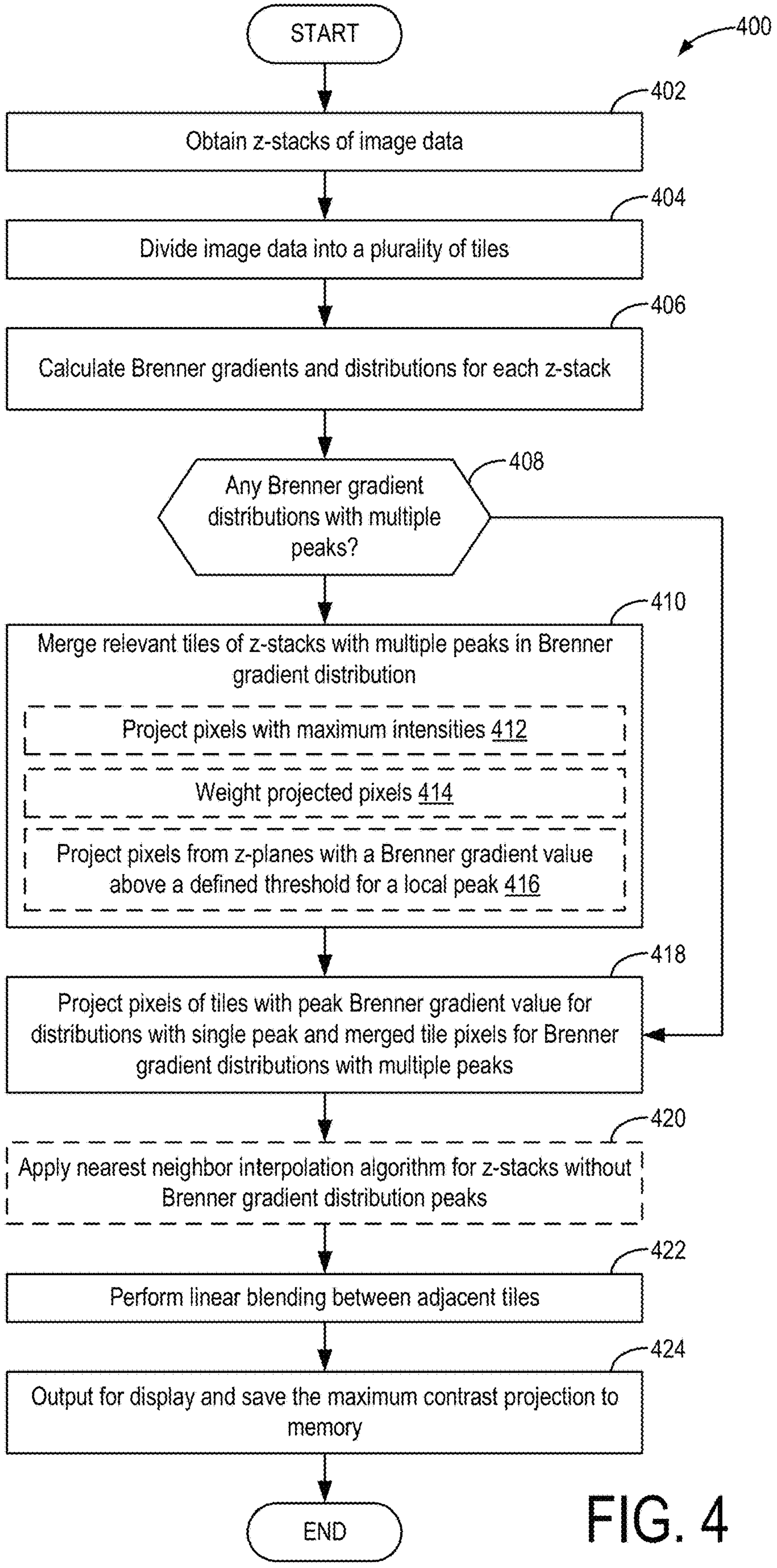
FIG. 4 shows a flowchart illustrating a method for generating a multi-plane MCP from image data.
Figure 5:
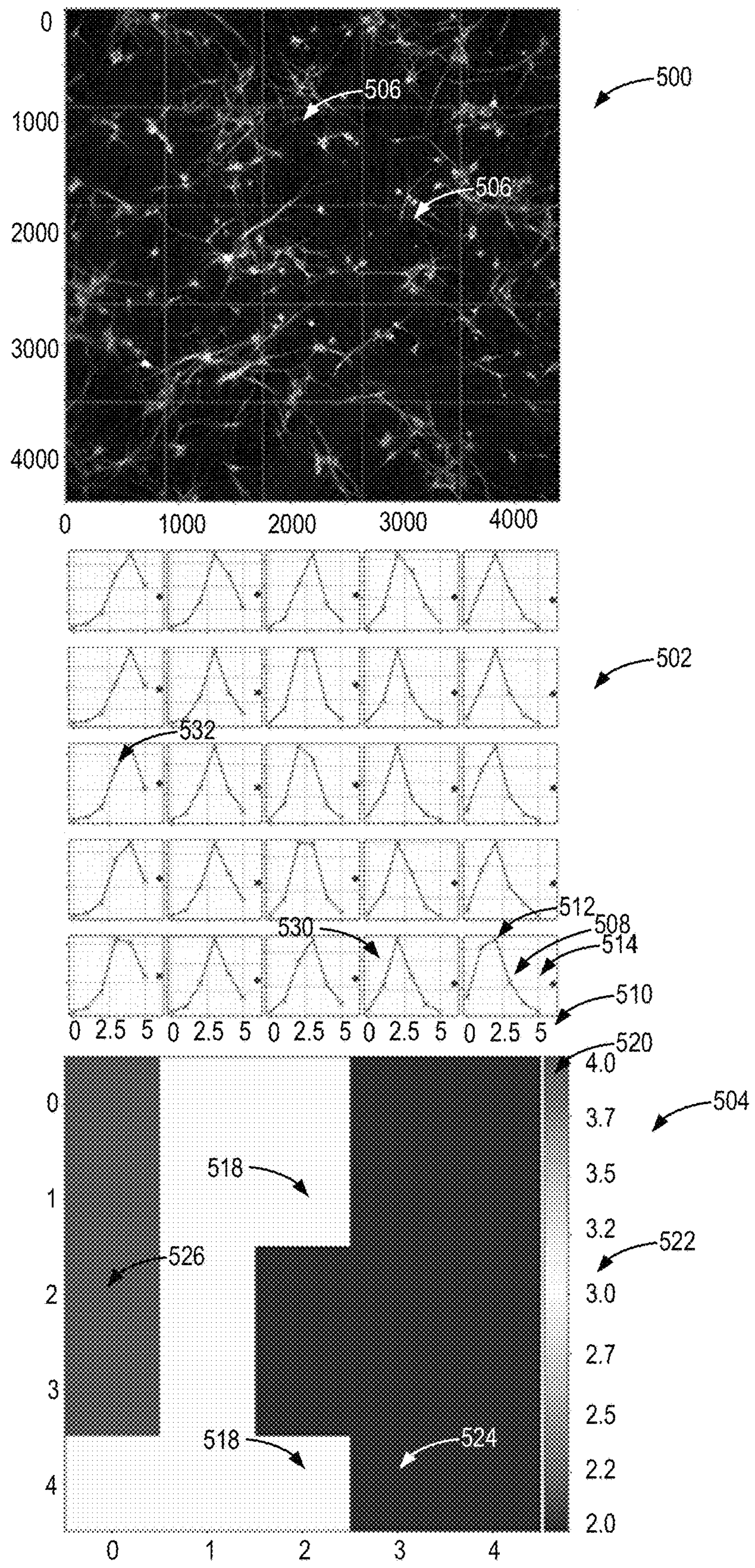
FIG. 5 shows an example image divided into tiles, resulting Brenner gradient distributions for each tile, and a corresponding heat map.
Figure 6A:
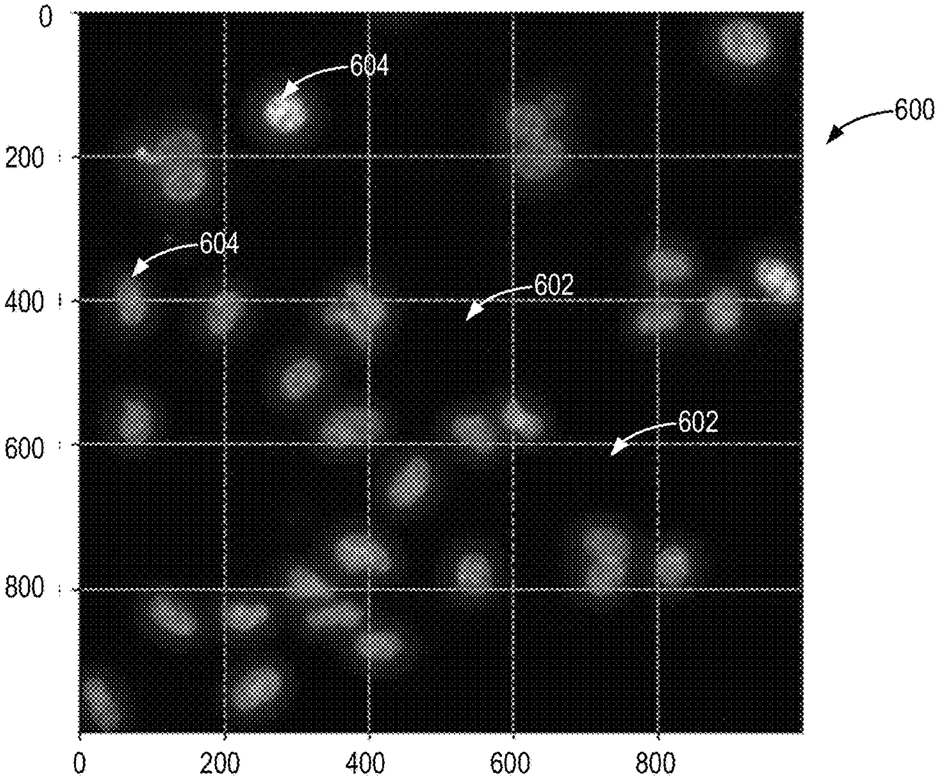
FIG. 6A shows a second example image divided into tiles.
Figure 6B:
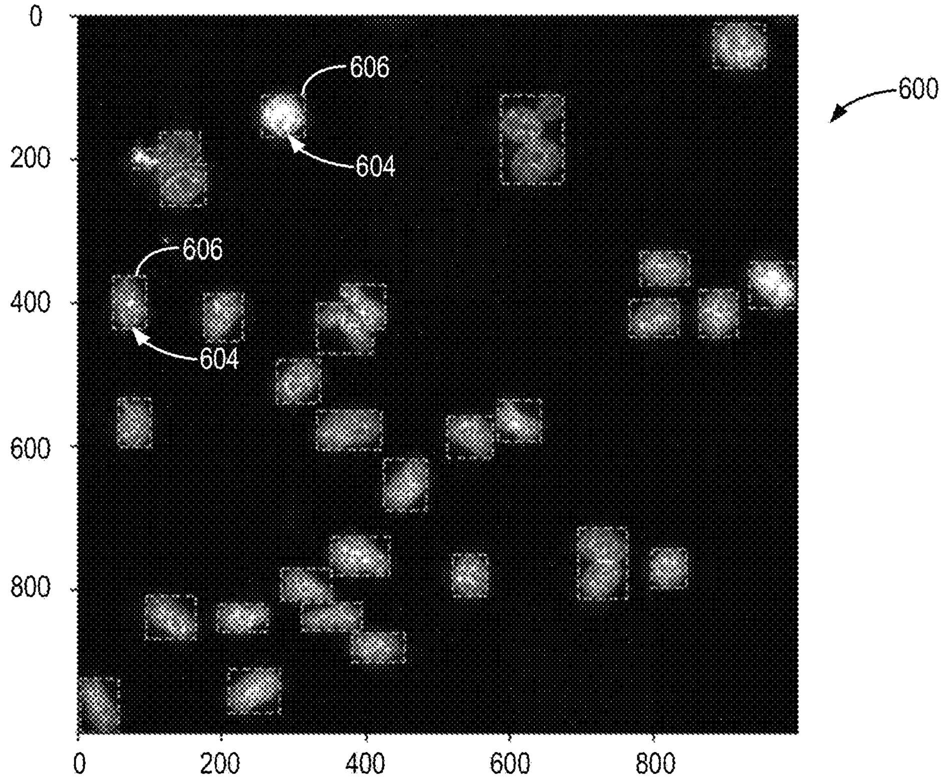
FIG. 6B shows the second example image segmented by meaningful structures.
Figure 7:
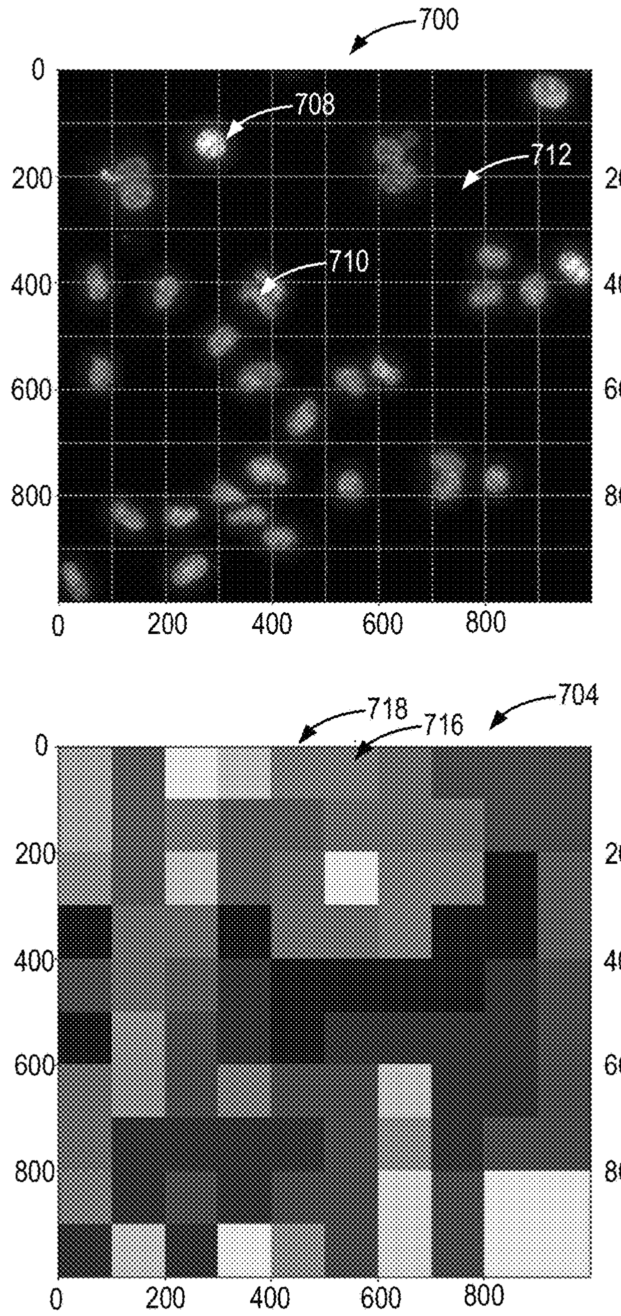
FIG. 7 shows a third example image and corresponding heat maps before and after nearest neighbor accommodation.
Figure 8:
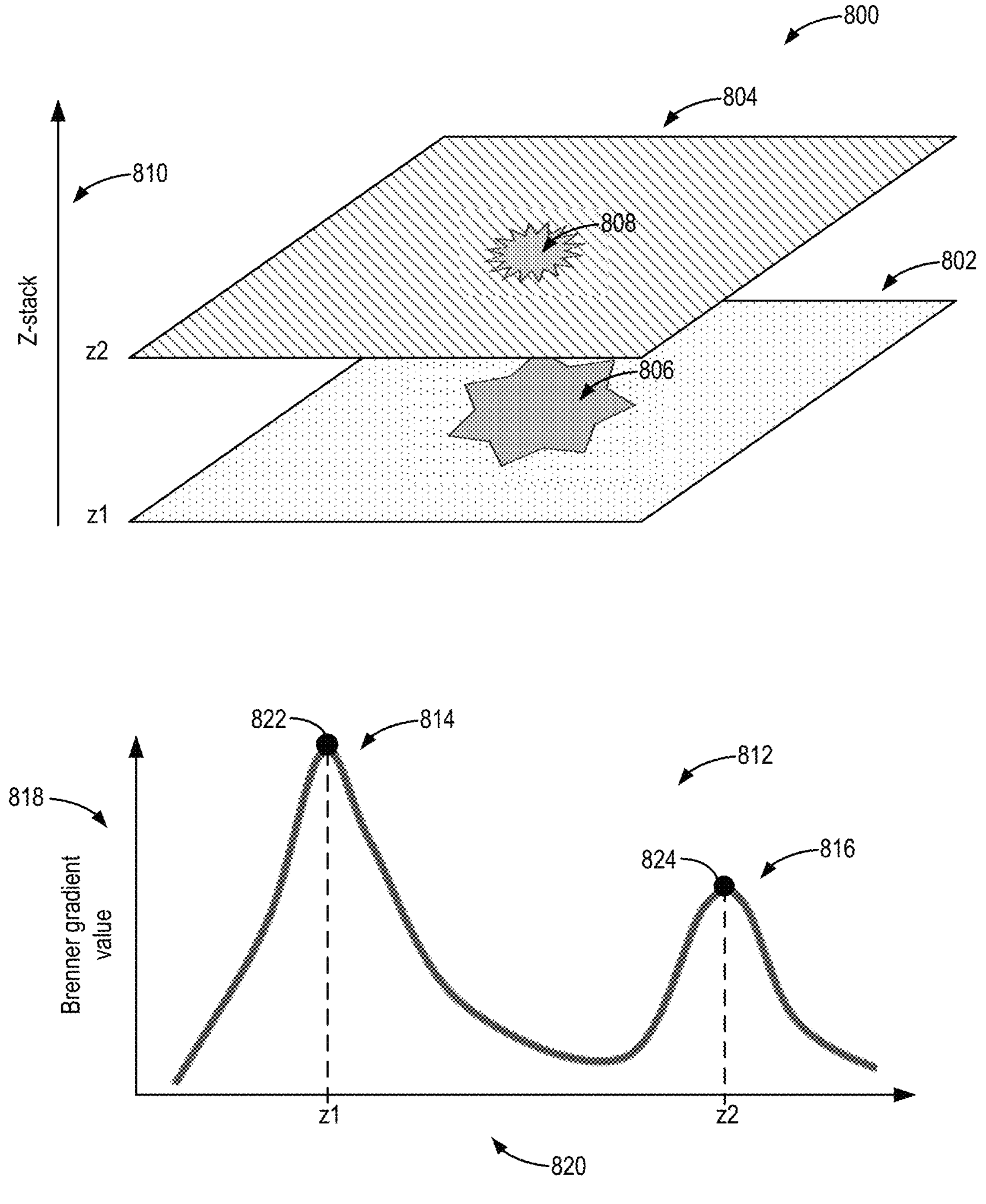
FIG. 8 shows an illustration of a first z-stack with multiple structures and a resulting Brenner gradient distribution.
Figure 9:
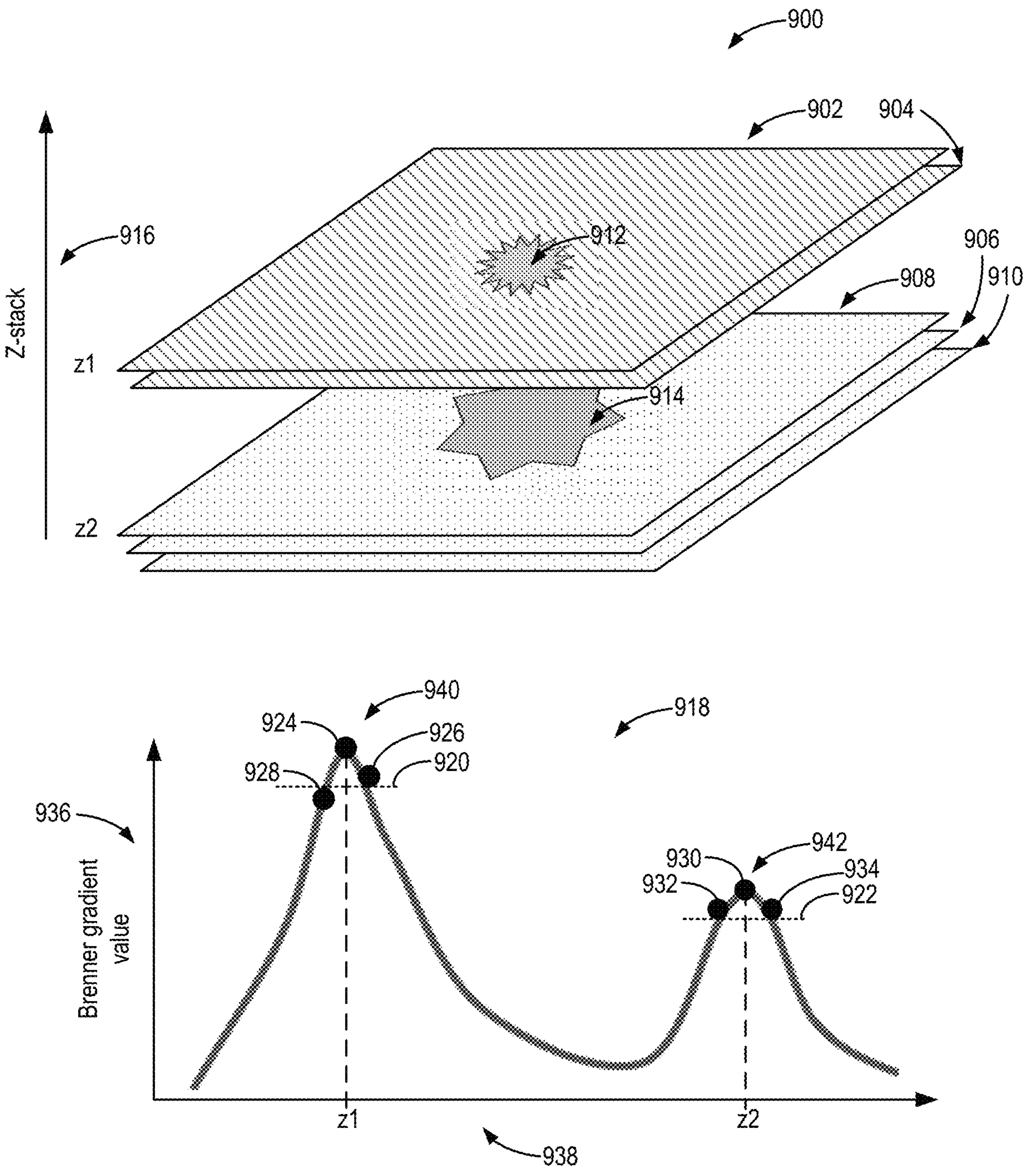
FIG. 9 shows an illustration of a second z-stack with multiple structures and a resulting Brenner gradient distribution.
Figure 10:
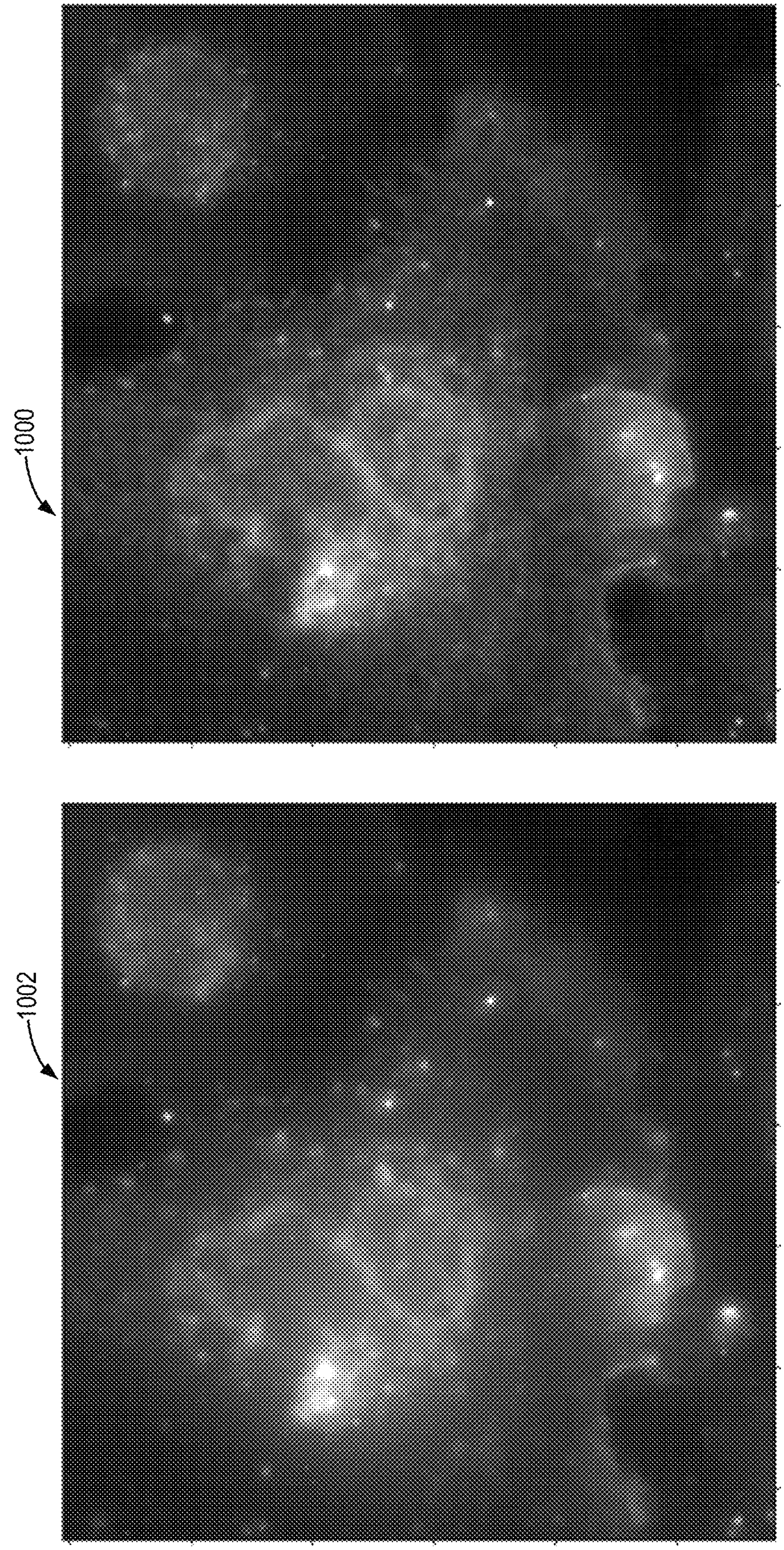
FIG. 10 shows an MCP and a maximum intensity projection (MIP) of the same image data.

The present description is related to two-dimensional projected images of image data. In particular, the methods and systems disclosed herein are related to maximum contrast projections (MCPs). The MCPs are referenced herein with respect to microscopy images, though it should be understood that this is a non-limiting example and the methods herein may be applied to other types of image data. The methods herein may be employed by a controller (e.g., a computing system) in communication with an imaging system, such as system 100 shown in FIG. 1. A method for generating an MCP is shown in FIG. 2, a second method for generating an MCP using object-oriented segmentation is shown in FIG. 3, and a third method for generating an MCP from data with structures in multiple z-planes is shown in FIG. 4. Each of the methods herein described utilize Brenner gradients and Brenner gradient distributions to determine what gets projected in a resulting MCP. An example of Brenner gradient distributions and a resulting heat map is shown in FIG. 5. An example of object-oriented segmentation is shown in FIG. 6B in contrast to uniform tiles as shown in FIG. 6A. Examples of heat maps before and after nearest neighbor interpolation for background data is shown in FIG. 7. Multi-plane data in z-stacks and resulting Brenner gradient distributions are shown in FIGS. 8 and 9. An example MCP image is shown in FIG. 10 in contrast to a maximum intensity projection (MIP) image of the same image data.

Two-dimensional projected images are commonly used to aggregate multiple images of image data into a single two-dimensional image. The multiple images of image data may be arranged in a z-stack wherein the images are stacked on top of one another each with a different z-coordinate. In some instances, image data may be subject to blurry or unfocused pixels as a result of differing object distances during image acquisition and/or artifact resulting from movement and/or vibration. A common two-dimensional projected image method is maximum intensity. The maximum intensity method projects a pixel from respective sub-z-stacks (e.g., a stack of pixels with the same x,y-coordinate and varying z-coordinates) with the highest pixel intensity value into the final projected image, or MIP image. In cases where certain pixels are unfocused or blurred as a result of varying object distances during acquisition, motion or vibration artifact, or other fact, background intensities may be higher in blurry areas than in focused areas. As a result, the projected pixels for background pixels based on the maximum intensity method may have a higher intensity value than the focused background pixels. This higher intensity value for background pixels may result in a “halo” effect around structures in the final MIP image, which causes the MIP image to have reduced resolution and degraded image quality.

The disclosed methods and systems provided herein at least partially addresses the aforementioned issues. Using contrast, as opposed to maximum intensity value, as the criterion for choosing which pixels are projected to a two-dimensional projection results in an image without the halo effect, and therefore the image may have increased quality and resolution as compared to an MIP of the same image data. By dividing image data into a plurality of tiles that are uniformly sized, one or more tiles being included in each sub-z-stack, the tile within each sub-z-stack that has the highest contrast may be determined and projected to a final MCP image. The methods herein, as previously described, employ Brenner gradient calculation to determine contrast, wherein a peak Brenner gradient value corresponds to a tile within a sub-z-stack with the highest contrast. Contrast, when defined via Brenner gradients, may be a measure of focus such that the highest contrast tiles are the tiles most in focus for each respective sub-z-stack.

In some instances, calculation of a Brenner gradient distribution for a sub-z-stack may not result in a peak value, such as is the case for background tiles that may not have any structures or objects therein. In such cases, a nearest neighbor interpolation algorithm may be applied to choose a tile from the sub-z-stack to project based on neighboring projected tiles1. Further, in some examples, the image data may be segmented to detect structures therein and define structure tiles for sub-z-stacks corresponding to the detected structures. The structure tile with the highest contrast od a specified sub-z-stack, as determined by calculation of the Brenner gradient distribution, may then be projected to the final MCP, replacing any pixels from an initial projection from uniform tiles. In this way, each structure or object may be projected to a final MCP from the most in focus tile corresponding to the structure or object, as determined by the Brenner gradient calculation.

Further, in some instances, a sub-z-stack may contain data of more than one structure at the same x,y-coordinate but different z-coordinates (e.g., in different tiles or z-planes). In such cases, a Brenner gradient distribution of the sub-z-stack may have more than one peak. A multi-plane MCP method for such instances may include merging and then projecting pixels of both tiles in one of a variety of ways, including projecting highest intensity pixels from either tile, projecting a weighted average of intensities, and more as will be described further in detail. In this way, multiple structures within the same sub-z-stack may be represented in a final MCP image.

Projecting pixels and/or groups of pixels based on relative local contrast may result in a more sharply focused projected image than a MIP image as the MCP method herein described may avoid projecting pixels that have artificially higher intensities as a result of blurring, artifact, or other error. In this way, the MCP methods herein described may provide images with higher image quality, lower signal-to-noise ratios, and reduced degradation.

Figure 1:
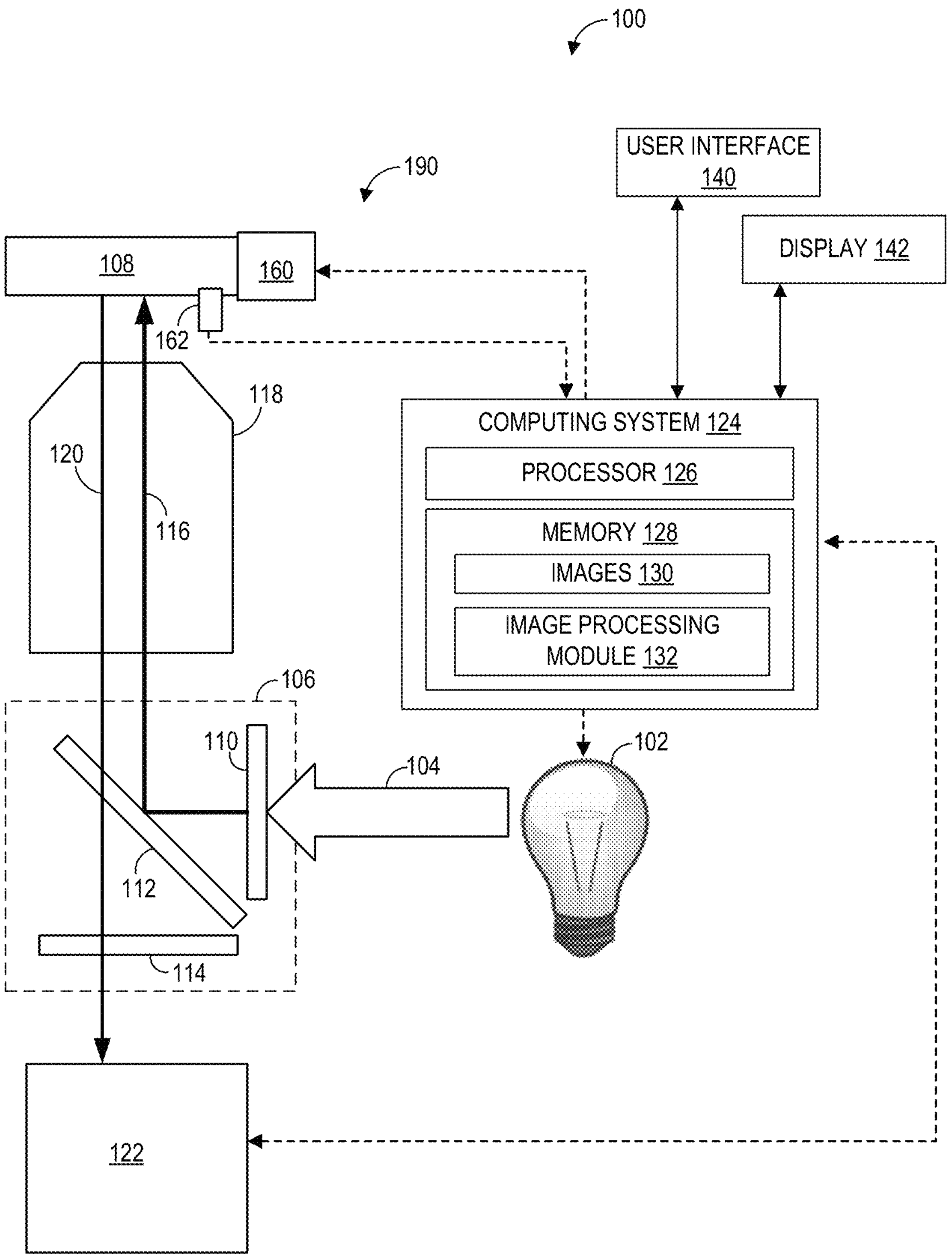
FIG. 1 shows a diagram of a system with an imager and a computing device.

Turning now to FIG. 1, a schematic diagram for a system 100 is shown. In one example, the system 100 may be configured as a wide-field microscopy system, such as a fluorescence microscopy system as herein described, though other configurations of the system 100 are possible. An imager 190 of the system 100 may include a light source 102 providing incident light to components arranged in a path of the incident light, as indicated by arrow 104. The light source 102 may be a mercury-vapor lamp, a xenon arc lamp, a laser, or one or more light-emitting diodes (LEDs). In some examples, the system 100 may be included in a multi-detector microscope system.

The incident light may be directed to a filter cube 106 (e.g., also called a filter block). The filter cube 106 may house components that filter the incident light such that target wavelengths are transmitted to a target to be analyzed, e.g., one or more samples supported on a sample holder 108.

In one example, the sample holder 108 may be a microplate. In the example of FIG. 1, three filtering components are arranged in the filter cube 106, including an excitation filter 110, a dichroic filter 112, and an emission filter 114. The incident light may first pass through the excitation filter 110 which filters the light to allow select, e.g., target, wavelengths to continue past the excitation filter 110 and block other wavelengths of light. The target wavelengths may be wavelengths that excite electrons in specific fluorophores or fluorochromes, resulting in release of photons when the excited electrons relax to a ground state.

The excitation light, e.g., light that has been filtered by the excitation filter 110, then strikes the dichroic filter 112 (or dichroic beamsplitter), as indicated by arrow 116. The dichroic filter 112 may be a mirror, for example, arranged at a 45 degree angle relative to an optical path of the system 100, e.g., angled at 45 degrees relative to the path of incident light indicated by arrow 104. A surface of the dichroic filter 112 may include a coating that reflects the excitation light, e.g., light filtered by the excitation filter 110, but allows fluorescence emitted from the sample at the sample holder 108 to pass therethrough. The reflected excitation light, as indicated by arrow 116, passes through an objective lens 118 to illuminate the sample holder 108. If the sample positioned in the sample holder 108 fluoresces, light is emitted, e.g., generating emission light as indicated by arrow 120, and collected by the objective lens 118. The emission light passes through the dichroic filter 112 and continues to the emission filter 114, which blocks undesired excitation wavelengths from passing therethrough. The filtered emission light is received at a detector 122. The detector 122 may be a camera, such as a charge-coupled device (CCD) camera, in one example. In other examples, the detector 122 may be another type of camera, for example, a CMOS camera, or a photomultiplier tube.

At the detector 122, the emission light may be converted into electronic data. For example, when the detector 122 is the CMOS camera, the detector 122 may include a light sensor configured as a transistor on an integrated circuit. Photons of the emission light may be incident on the light sensor and generate an electrical charge that is converted into electronic data representative of a photon pattern of the emission light captured within a field of view (FOV) of the camera. The electronic data may be stored at a memory of the camera, such as random access memory, and may be retrieved by a computing system 124.

The computing system 124 may be a computing device or other computer. The computing system 124 may include a processor 126 and a memory 128. The processor 126 may comprise one or more computational components usable for executing machine-readable instructions. For example, the processor 126 may comprise a central processing unit (CPU) or may include, for example a graphics processing unit (GPU). The processor 126 may be positioned within the computing system 124 or may be communicatively coupled to the computing system 124 via a suitable remote connection.

The memory 128 may comprise one or more types of computer-readable media, including volatile and/or non-volatile memory. The volatile memory may comprise, for example, random-access memory (RAM), and the non-volatile memory may comprise read-only memory (ROM). The memory 128 may include one or more hard disk drive(s) (HDDs), solid state drives (SSDs), flash memory, and the like. The memory 128 is usable to store machine-readable instructions, which may be executed by the processor 126. The memory 128 is further configured to store images 130, which may comprise digital images captured or created using a variety of techniques, including digital imaging, digital illustration, and more. The images 130 may further include one or more reference images and/or one or more acquired images.

At least a portion of the images 130 may be acquired via the system 100. The memory 128 further includes an image processing module 132, which comprises machine-readable instructions that may be executed by the processor 126 to remove crosstalk interference from the images 130. The image processing module 132 thus contains machine-readable instructions for manipulation of digital images (e.g., the images 130), such as instructions to perform crosstalk mitigation methods. For example, the machine-readable instructions stored in the image processing module 132 may correspond to one or more methods, examples of which are provided with respect to FIGS. 2-3.

The system 100 further include a user interface 140, which may comprise one or more peripherals and/or input devices, including, but not limited to, a keyboard, a mouse, a touchpad, or virtually any other input device technology that is communicatively coupled to the computing system 124. The user interface 140 may enable a user interact with the computing system 124, such as to select one or more images to evaluate, to select one or more parameters of the imager 190, and so forth.

The system 100 further includes a display device 142, which may be configured to display results of crosstalk removal, display the images themselves, and display possible parameter options and selections related to the acquisition of images, including one or more dye wavelengths, channels, and emission spectra, for example. The user may select or otherwise input parameters via the user interface 140 based on options displayed via the display device 142.

The computing system 124 may be communicatively coupled to components of the system 100. For example, the computing system 124 may be configured to command activation/deactivation of the light source 102 when prompted based on user input. As another example, the computing system 124 may instruct adjustment of a position of the sample holder 108 to focus the excitation light on a different region of the sample holder. The computing system 124 may command actuation of a motor 160 coupled to the sample holder 108 to vary the position of the sample holder 108 with respect to the objective lens 118 and the excitation light and provide instructions on how the sample holder position is to be modified. In some examples, a position sensor 162 may monitor the actual position of the sample holder 108 and may be communicatively coupled to the computing system 124 to relay the sample holder position to the computing system 124.

The computing system 124 may also be communicatively coupled to the detector 122. As such, electronic data collected by the detector 122 may be retrieved by the computing system 124 for further processing and display at an interface, such as a computer monitor. It will be appreciated that the computing system 124 may be further coupled to other sensors and actuators of the system 100. In one example, communication between the computing system 124 and the sensors and actuators of the system 100 may be enabled by various electronic cables, e.g., hardwiring. In other examples, the computing system 124 may communicate with the sensors and actuators via a wireless protocol, such as Wi-Fi, Bluetooth, Long Term Evolution (LTE), etc.

It will be appreciated that the system 100 depicted in FIG. 1 is a non-limiting example of a system with an imager and a computing device. Other examples may include variations in quantities of individual components, such as a number of dichroic, excitation, and emission filters, a configuration of the light source, relative positioning of the components, etc. In one example, the system 100 may be used for high through-put screening of biological samples. It should also be understood that the methods and systems herein described are not limited to microscopy systems and may be implemented for other types of imaging systems such as computerized tomography (CT), positron emission tomography (PET), magnetic resonance angiography (MRA), and more.

Turning now to FIG. 2, a flowchart illustrating an example method 200 for generating am MCP is shown. The method 200, and other methods disclosed herein, may be executed by a processor of a computing system that is communicatively coupled to an imager, such as the processor 126 of the computing system 124 of FIG. 1, according to instructions stored in non-transitory memory of the computing system (e.g., within the memory 128 of FIG. 1).

At 202, method 200 includes obtaining image data. The image data may be a collection of two-dimensional z-plane images of a sample. Each z-plane image may have the same x,y-coordinates but a different z-coordinate. The z-plane images may be stacked on top of one another to form the image data and as such the image data may be a z-stack of images. In some examples, the image data may be acquired by an imager of an imaging system, such as imager 190 of system 100 of FIG. 1, and stored in memory of the computing system.

At 204, method 200 includes dividing (e.g., partitioning) the image data into tiles and sub-z-stacks. The tiles may be of uniform size and may be configured as a grid. In some examples, each tile may comprise a collection of pixels, for example each tile may be a 50×50 pixel square. Size of the tiles may be predefined based on a smallest feature of interest within the image data. For example, if the smallest feature of interest within the image data is 20 pixels wide, a tile size of 20×20 pixels may be chosen. In some examples, tile size smaller than 10×10 pixels may not have sufficient statistical significance to render calculations of contrast usable. Further, in some examples, tile sizes that are significantly larger than the smallest feature of interest (e.g., two to three times larger in area) may result in decreased focus in a final MCP image if multiple features of interest reside within a single tile and have different focal points such that if the tile is projected into the MCP image, one or more of the features of interest may not be in focus.

The image data, as previously described, comprises a z-stack of z-plane images. Division of the image data into a plurality of tiles also includes dividing the image data into a plurality of sub-z-stacks. Tiles that have the same x,y-coordinates may each belong to a respective sub-z-stack, the sub-z-stack comprising each tile with specified x,y-coordinates. Each tile within the sub-z-stack may belong to one of the z-plane images of the image data. As an example, image data that contains three z-planes may be divided into nine sub-z-stacks, each sub-z-stack containing three tiles, with a total number of tiles of the image data being twenty-seven.

At 206, method 200 includes identifying a tile within each sub-z-stack with a highest local contrast. In some examples, identification of highest local contrast among tiles in a sub-z-stack may be accomplished via calculation of a Brenner gradient distribution for each sub-z-stack, as noted at 208. A Brenner gradient value may be calculated by equations (1), (2), or (3):

$$B_{z,y} = \frac{\sum_{x,y}(I(x, y+2) - I(x, y))^2}{\sum_{x,y} I(x, y)^2} \quad (1)$$

$$B_{z,x} = \frac{\sum_{x,y}(I(x+2, y) - I(x, y))^2}{\sum_{x,y} I(x, y)^2} \quad (2)$$

$$B_z = \sqrt{B_{z,x}^2 + B_{z,y}^2} \quad (3)$$

where $B_z$ is the Brenner gradient from a tile acquired at coordinate z and I(x, y) is pixel intensity located at coordinate (x, y) within the tile. Equation (1) may result a Brenner gradient value sensitive to the vertical structure in the image and equation (2) may result a Brenner gradient value sensitive to the horizontal structure in the image. Equation (3) may account for both vertical and horizontal structures of the image. A sub-z-stack may have Brenner gradient values for each tile within the sub-z-stack. A resulting Brenner gradient distribution, which plots Brenner gradient values for each tile within the z-stack, may also be generated. A tile with a highest Brenner gradient value (e.g., a peak) may be said to have the highest local contrast. Local contrast, as measured by the Brenner gradient, may describe how in focus the tile is, such that the tile with the highest local contrast is the most in focus tile of a specified sub-z-stack. Projecting tiles that are the most in focus, as determined by the Brenner gradient distributions (e.g., via calculations using equations (1), (2), or (3)), may provide the content with best contrast and resolution while reducing the possibility of a halo effect on the MCP projection, thereby increasing image quality and reducing image degradation.

Brenner gradient values are a relative measure and as such, a first range of values for a first sub-z-stack may differ from a second range of values for a second sub-z-stack. For example, a first peak for the first sub-z-stack may have a first value and a second peak for the second sub-z-stack may have a second value. The first value of the first peak may be lower than non-peak values of the second sub-z-stack because the first range of values differs from the second range of values.

At 210, method 200 determines if there are one or more sub-z-stacks with background pixels only. Sub-z-stacks with background only may not have any features of interest, structures, objects, or other therein. A Brenner gradient distribution for a sub-z-stack without a feature of interest, structure, object, or the like may not have a statistically significant peak. In some examples, in the absence of a valid feature or structure, pixel values may be based on random noise (e.g., Poisson or Gaussian noise) and as a result, the Brenner gradients calculated by equations (1), (2), and/or (3) may be noise-like. Selection of which of the tiles to project for the sub-z-stack without a feature of interest, structure, object, or the like may be random based on noise as there is no clear peak in the Brenner gradient distribution. If there is one or more sub-z-stacks with background pixels only (YES), as may be determined based on detection of Brenner gradient distributions without peaks, method 200 may proceed to 212. If there are not any sub-z-stacks with background pixels only (NO), as may be determined by a lack of any Brenner gradient distributions without peaks, method 200 proceeds to 214.

At 212, method 200 includes applying a nearest neighbor interpolation algorithm for each background pixel only sub-z-stack. The nearest neighbor interpolation algorithm may choose a tile from each background sub-z-stack based on the tiles determined to have the highest local contrast by the Brenner gradient distributions of one or more neighboring (e.g., adjacent) sub-z-stacks. This may minimize intensity discontinuity between adjacent tiles such that background pixels in the final MCP image from adjacent sub-z-stacks have similar intensities to reduce discontinuous pixel intensities in adjacent pixels. Application of the nearest neighbor interpolation algorithm may fill in any gaps in an MCP image resulting from background pixels that do not generate a usable Brenner gradient distribution.

At 214, method 200 includes projecting pixels of identified tiles, identified either from the Brenner gradient distributions or the nearest neighbor interpolation, to an MCP image. Pixels of tiles determined to have the highest local contrast by the Brenner gradient distributions may be projected for respective sub-z-stacks and pixels of tiles determined for background sub-z-stacks based on the nearest neighbor interpolation may be projected for respective sub-z-stacks. In this way, each sub-z-stack of the image data may have an identified tile projected to the MCP image and the MCP image may include data from each sub-z-stack. In this way, MCP is able to aggregate data from multiple images (e.g., a z-stack of z-plane images) into a single image.

At 216, method 200 includes performing linear blending between adjacent tiles. Because projected tiles may stem from different z-plane images, discontinuity with regards to intensity and focus between adjacent projected tiles may be present. In some examples, chance of discontinuity increases as step size between z-plane images increases. Linear blending may aim to reduce artifact that results from this discontinuity. A linear blending scheme may include weighting functions with linear variations for overlapping pixels of two adjacent projected tiles. For example, a buffer area on either side of a tile border, for example five pixels on either side of a border between two tiles, may be defined. In the buffer area, a blending scheme may be applied. This may include, for example, taking a percentage defined by the linear variation of an intensity from the adjacent pixels or, for a specified sub-z-stack coordinate, taking a percentage of pixel intensities from a z-plane image that corresponds to the tile projected in the adjacent tile. In some examples, percentage taken from the adjacent tile may decrease further from the tile border. In this way, blending over the border may be achieved to decrease discontinuity between adjacent tiles and increase overall image quality.

At 218, method 200 includes outputting the MCP image for display. For example, the MCP image that results following linear blending at 216 may be displayed on a display device (e.g., display device 142 of FIG. 1) of the computing device on which method 200 is executed. Displaying the MCP image may allow for a user of the computing device and/or the imaging system to view the MCP image.

At 220, method 200 includes saving the MCP image to memory. In some examples, the memory to which the MCP is saved may be memory 128 of the system 100 of FIG. 1. In other examples, the memory to which the MCP is saved may be a different memory, such as an external memory storage device or cloud computing platform. Saving the MCP image to memory may allow for use of the MCP image at a later time or on a different computing device. Following 220, the method 200 may end.

Turning now to FIG. 3, a flowchart illustrating another example method 300 for generating an object oriented MCP image is shown. As described with reference to FIG. 2, the method 300 may be executed by a processor of a computing device communicatively coupled to a system, such as the processor 126 of the computing system 124 of FIG. 1, according to instructions stored in non-transitory memory of the computing system.

At 302, method 300 includes obtaining image data. The image data may be a z-stack of two-dimensional z-plane images of a sample. Each z-plane image may have the same x,y-coordinates but a different z-coordinate. The z-plane images may be stacked on top of one another to form the image data and as such the image data may be a z-stack of images. In some examples, the image data may be acquired by an imager of an imaging system, such as imager 190 of system 100 of FIG. 1, and stored in memory of the computing system.

At 304, method 300 includes dividing the image data into a plurality of uniformly sized tiles and a first plurality of sub-z-stacks. In some examples, each tile may comprise a collection of pixels, for example each tile may be a 50×50 pixel square. As previously described with respect to FIG. 2, a size of the tiles may be predefined based on a smallest feature of interest within the image data. The image data, as previously described, comprises a collection of z-plane images. Division of the image data into a plurality of tiles also includes dividing the image data into a plurality of sub-z-stacks. Tiles that have the same x,y-coordinates may each belong to a sub-z-stack, each sub-z-stack comprising each tile with specified x,y-coordinates. Each tile within the sub-z-stack may belong to one of the z-plane images of the image data, as described with respect to FIG. 2.

At 306, method 300 includes detecting structures (e.g., features of interest, objects, etc.) within the image data and segmenting the image data to define one or more structure tiles for each of a second plurality of sub-z-stacks, each of the second plurality of sub-z-stacks corresponding to a detected structure. Segmentation is a process by which image data is partitioned into multiple regions in order to locate objects in images. By segmenting the image data, structures therein may be localized and tile boundaries may be sized and placed to encompass each of the detected structures. For each sub-z-stack corresponding to a detected structure, one or more structure tiles may be defined according to the number of z-planes of the image data. For example, for image data that includes five z-planes, a sub-z-stack corresponding to a detected structure may have five structure tiles therein.

Each of the one or more structure tiles for each sub-z-stack of the second plurality of sub-z-stacks may be uniformly sized (e.g., of equal size), but the tiles among different sub-z-stacks of the second plurality of sub-z-stacks may have different sizes based on a size of a respective detected structure. For example, a first sub-z-stack for a first structure may comprise one or more structure tiles of a first size and a second sub-z-stack for a second structure may comprise one or more structure tiles of a second, different size. In this way, the size of each tile may be object-oriented, whereby the size of a tile corresponds to a size of the imaged structure contained therein. Tile boundaries that are object-oriented may encompass one structure such that projection of a tile, as will be further described below, projects all, or nearly all, of the structure as opposed to the plurality of uniformly sized tiles described at 304, which may have boundaries that bisect one or more structures given that the tile boundaries are placed without regard of structure location.

At 308, method 300 includes identifying a tile with a highest local contrast for each of the first plurality of sub-z-stacks. In some examples, identification of highest local contrast among tiles in a sub-z-stack may be accomplished via calculation of Brenner gradient values for each of the plurality of uniform tiles and a Brenner gradient distribution for each of the first plurality of sub-z-stacks, as noted at 310. A Brenner gradient value may be calculated by equations (1), (2), and/or (3), as described above. A resulting Brenner gradient distribution, which plots Brenner gradient values for each tile within the sub-z-stack, may also be generated. A tile with a highest Brenner gradient value (e.g., a peak) may be said to have the highest local contrast (e.g., most in focus). Projecting tiles that are the most in focus, as determined by the Brenner gradient distributions (e.g., via calculations using equations (1) and (2)), may reduce possibility of a halo effect on the MCP projection, thereby increasing image quality and reducing image degradation.

Identification of the highest local contrast tile for each of the first plurality of sub-z-stacks may provide for a baseline projection image, allowing for identification of background tiles, as will be further described below. In some examples, object-orientation is performed via projection of tiles from the second plurality of sub-z-stacks that replace tiles of the first plurality of sub-z-stacks, as will be further described below.

At 312, method 300 includes identifying a structure tile with highest local contrast for each of the second plurality of sub-z-stacks. As described above, determination of highest local contrast within a sub-z-stack may be accomplished via calculation of a Brenner gradient for each of the one or more structure tiles and generation of a Brenner gradient distribution for each of the second plurality of sub-z-stacks, as noted at 314. A tile with a highest Brenner gradient value (e.g., a peak) of a respective Brenner gradient distribution may be said to have the highest local contrast (e.g., most in focus) for a corresponding sub-z-stack. Projecting tiles that are the most in focus, as determined by the Brenner gradient distributions may reduce possibility of a halo effect on the MCP image, thereby increasing image quality and reducing image degradation.

At 316, method 300 optionally includes applying nearest neighbor interpolation algorithm for Brenner gradient distributions of the first plurality of sub-z-stacks without a peak. As described previously, in some examples, a Brenner gradient distribution may not have any identifiable peaks as a result of a lack of a target in any tile of a respective sub-z-stack. Such distributions that do not have peaks may be identified as background. Nearest neighbor interpolation, as described above, may utilize the identified highest contrast tiles from adjacent or neighboring sub-z-stacks to determine which tile to project for background-only tiles. Nearest neighbor interpolation for background tiles may decrease discontinuity between tiles in the MCP image. In some examples, all Brenner gradient distributions may have a peak, such as when all tiles contain structures, and as such nearest neighbor interpolation may be skipped. As is described with respect to method 200, demand for application of the nearest neighbor interpolation algorithm may be determined based on identification of Brenner gradient distributions without peaks. If there is at least one Brenner gradient distribution without a peak, step 316 may be performed. If each Brenner gradient distribution has a peak, step 316 may be skipped.

Nearest neighbor interpolation may be performed for the first plurality of sub-z-stacks but not the second plurality of sub-z-stacks. Because the second plurality of sub-z-stacks are object-oriented, no background-only sub-z-stacks may be included. Therefore, the nearest neighbor interpolation may be relevant to only the first plurality of sub-z-stacks. In this way, the first plurality of sub-z-stacks may allow for determination of which tiles to project for background pixels and, in some examples, fainter structure not detected by the segmentation algorithm, and the second plurality of sub-z-stacks may allow for determination of which tiles to project for structure pixels.

At 318, method 300 includes projecting pixels of an identified tile with the highest local contrast, as determined by Brenner gradient distributions, for each of the first plurality of sub-z-stacks with a peak and projecting pixels of tiles determined by nearest neighbor interpolation for each of the first plurality of sub-z-stacks without a peak. A resulting MCP may be a non-object-oriented MCP, similar to as described with respect to method 200 of FIG. 2, wherein each tile projected is of the plurality of uniformly sized tiles of the first plurality of sub-z-stacks.

At 320, method 300 includes projecting pixels of the identified structure tile with highest local contrast for each of the second plurality of sub-z-stacks. In some examples, x,y-coordinates of tiles of the second plurality of sub-z-stacks may overlap with x-y coordinates of projected tiles of the first plurality of sub-z-stacks. In such examples, identified structure tiles of the second plurality of sub-z-stacks, if from a different z-plane than a corresponding projected tile of the first plurality of sub-z-stacks, may replace the projected tile of the first plurality of sub-z-stacks or replace certain pixels of the projected tile of the first plurality of sub-z-stacks (e.g., pixels that correspond to the x,y-coordinates of the pixels of the tile of the second plurality of sub-z-stacks). If a tile with the highest local contrast for one of the second plurality of sub-z-stacks is from the same z-plane as a corresponding projected tile for one of the first plurality of sub-z-stacks (wherein corresponding indicates overlapping x,y-coordinates), replacement may not change the projected pixels.

At 322, method 300 includes performing linear blending between adjacent projected tiles. As is described above, linear blending reduces discontinuity between adjacent projected tiles that results from projection of tiles from differing z-planes with different focuses. In some examples, linear blending may include applying weighting functions with linear variations to intensity of overlapping pixels of two adjacent tiles (e.g., pixels in a buffer area) with one intensity increasing and the other intensity decreasing. A weighted average may determine pixel value in the buffer zone of the MCP image. In this way, edges between adjacent tiles may be smoothed, thereby reducing discontinuity.

At 324, method 300 includes outputting the MCP image for display. Following projection of tiles from the first and second plurality of sub-z-stacks and linear blending between adjacent tiles, a final object-oriented MCP may be outputted for display on a display device such as display device 142 of FIG. 1. The MCP image may also be saved to memory of the computing device and/or to external memory.

Object-oriented MCP, as described by method 300, may allow for higher priority placement on structures of interest within the image data. Structures within an imaged sample, such as bio-structures, may be a main object of interest of image data. Placing higher priority for projection during aggregation of multiple images of the image data may allow for the bio-structures to be most in focus, corresponding to projecting pixels of structure tiles rather than projecting pixels of uniformly sized tiles. Further, in some examples, uniformly sized tiles may separate structures of interest into two or more adjacent tiles. Object-oriented MCP mitigates this issue by generating tiles and sub-z-stacks specific to structures.

Turning now to FIG. 4, a flowchart illustrating another example method 400 for multi-plane MCP is shown. As described with reference to FIGS. 2 and 3, the method 400 may be executed by a processor of a computing device communicatively coupled to a system, such as the processor 126 of the computing system 124 of FIG. 1, according to instructions stored in non-transitory memory of the computing system.

At 402, method 400 includes obtaining image data. The image data may be a z-stack of two-dimensional z-plane images of a sample. Each z-plane image may have the same x,y-coordinates but a different z-coordinate. The z-plane images may be stacked on top of one another to form the image data and as such the image data may be a z-stack of images. In some examples, the image data may be acquired by an imager of an imaging system, such as imager 190 of system 100 of FIG. 1, and stored in memory of the computing system.

At 404, method 400 includes dividing the image data into tiles and sub-z-stacks. The tiles may be of uniform size. In some examples, each tile may comprise a collection of pixels. Size of the tiles may be predefined based on a smallest feature of interest within the image data. For example, if the smallest feature of interest within the image data is 20 pixels wide, a tile size of 20×20 pixels may be chosen. In some examples, tile size smaller than 10×10 pixels may not have sufficient statistical significance to render calculations of contrast usable. Further, in some examples, tile sizes that are significantly larger than the smallest feature of interest (e.g., two to three times larger in area) may result in decreased focus in a final MCP image if multiple features of interest reside within a single tile and have different focal points such that one or more of the features of interest in the single tile may not be in focus.

The image data, as previously described, comprises a z-stack of z-plane images. Division of the image data into a plurality of tiles also includes dividing the image data into a plurality of sub-z-stacks. Tiles that have the same x,y-coordinate may each belong to a sub-z-stack, the sub-z-stack comprising each tile with a specified x,y-coordinate. Each tile within the sub-z-stack may belong to one of the z-plane images of the image data.

At 406, method 400 includes calculating Brenner gradients and distributions for each tile and sub-z-stack, respectively. As previously described, a Brenner gradient may be calculated using equations (1), (2), and/or (3) for each tile within each sub-z-stack. A distribution of Brenner gradients for each sub-z-stack may then be generated. In some examples, distributions may have a single peak, wherein the peak indicates the tile with the highest local contrast. In other examples, one or more distributions may have multiple peaks, indicating that multiple tiles within the sub-z-stack have high contrast structures therein. In yet further examples, one or more distributions may have no peaks, indicating that no structures are present in any tiles of the sub-z-stack, such as with a sub-z-stack with only background pixels.

At 408, method 400 judges whether there are any Brenner gradient distributions with multiple peaks. As discussed, a Brenner gradient distribution may have no peaks, one peak, or more than one peak. A Brenner gradient with more than one peak may indicate that there are multiple objects or structures of interest within a sub-z-stack (e.g., structures located at the same x,y-coordinate but different z-coordinates). If one or more Brenner gradient distributions are identified as having more than one peak (YES), method 400 proceeds to 410. If no Brenner gradient distributions have more than one peak (NO), method 400 proceeds to 418.

At 410, method 400 includes merging relevant tiles of sub-z-stacks with multiple peaks in a Brenner gradient distribution. Merging may be accomplished via various methods. For example, merging may include projecting pixels of specified x,y-coordinates with maximum intensities, as noted at 412. As an example, a Brenner gradient distribution that has two peaks may include a first tile of a first z-plane corresponding to a first peak and a second tile of a second z-plane corresponding to a second peak. Projecting pixels with highest pixel intensities may include choosing pixels at specified x,y-coordinates from either the first tile or the second tile based on whichever has the highest intensity value.

In other examples, merging relevant tiles may include weighting projected pixels, as noted at 414. In some examples, weighting may be based on respective Brenner gradient values, whereby a first tile corresponding to a first peak with a first Brenner gradient value is weighted higher than a second tile corresponding to a second peak with a second Brenner gradient value that is less than the first Brenner gradient value. A pixel intensity value that is projected to the MCP image may be a weighted average of the two tiles, the weighted average being based on the weighting that is based on the Brenner gradient values. Weighting based on Brenner gradient value (e.g., peak height) may put stress on an object with higher contrast in the final MCP image.

In other examples, weighting may be based on respective z-coordinates of the relevant tiles. For example, pixels of a first tile with a first z-coordinate below (e.g., vertically below in examples in which a z-axis aligns with gravity) a second z-coordinate of a second tile may be weighted lower than pixels of the second tile. Similar to weighting based on Brenner gradient value, the pixel intensity that is projected to the MCP image may be a weighted average of the two tiles that is based on z-coordinates. Weighting based on z-coordinate position may demonstrate spatial distance information that may allow for visualization of depth in the final MCP image.

In yet further examples, merging relevant tiles may include projecting pixels from z-planes with a Brenner gradient value above a defined threshold for a local peak, as noted at 416. In some examples, more than one tile may have Brenner gradient values above a threshold specific to a local peak. For example, a first peak may correspond to a first tile, and a second tile adjacent to the first tile may have a Brenner gradient value near the first peak, near being above a predefined threshold. Additional z-plane data may be included from one or both sides of the first peak (e.g., from tiles with z-coordinates above or below the first tile). Thresholds may be based on a percentage (e.g., 90%) of the first peak. Lower thresholds allow for inclusion of more additional z-plane data. Projection in examples that include additional z-plane data may be based on highest pixel intensity value, similar to as described at 412. Due to the adjustable nature of threshold value, a multi-plane MCP as herein described may be tailored for different application demands. As an example, for biological samples that tend to be aligned or immobilized along a single surface, such as the bottom of the multi-well plate or slide, a higher threshold may produce a final MCP image with better contrast and sharper details. Conversely, if the sample is known to be distributed amongst multiple different z-planes, a lower threshold may include more structures of interest located at different z-coordinates, though may also result in lower contrast and sharpness of the image.

At 418, method 400 includes projecting pixels of tiles with peak Brenner gradient values for distributions with a single peak and merged tile pixels for Brenner gradient distributions with multiple peaks. As described with respect to method 200 of FIG. 2, tiles that correspond to a peak of a Brenner gradient distribution with a single peak may be considered to have the highest local contrast and pixels of those tiles may be projected to the MCP image. Brenner gradient distributions with more than one peak, as described above, may have multiple tiles with relevant data and pixels of those tiles may be merged in various ways, as described above. The merged tile pixels may be projected to the MCP image for sub-z-stacks where Brenner gradient distributions have multiple peaks. In this way, the MCP image may include pixels of sub-z-stacks of single peak Brenner gradient distributions and/or multi-peak Brenner gradient distributions. Projection of pixels from sub-z-stacks with multiple features of interest at different z-coordinates as described herein may allow for multiple features of interest with the same x,y-coordinates to be shown in the MCP image, wherein emphasis is placed on certain features based on depth, pixel intensity values, or contrast, as described above.

At 420, method 400 optionally includes applying nearest neighbor interpolation algorithm for sub-z-stacks with Brenner gradient distributions without a peak. As described previously, in some examples, a Brenner gradient distribution may not have any identifiable peaks as a result of a lack of a target in any tile of the distribution. Such distributions that do not have peaks may be identified as background. Nearest neighbor interpolation, as described above, may utilize the identified highest contrast tiles from adjacent or neighboring sub-z-stacks to determine which tile to project for background-only tiles. Nearest neighbor interpolation for background tiles may decrease discontinuity between tiles in the MCP image. In some examples, all Brenner gradient distributions may have at least one peak, such as when all tiles contain structures, and as such nearest neighbor interpolation may be skipped.

At 422, method 400 includes performing linear blending between adjacent tiles. As is described above, linear blending may reduce discontinuity between adjacent tiles that results from projection of tiles from differing z-planes with different focuses. In some examples, linear blending may include applying weighting functions with linear variations to intensity of overlapping pixels of two adjacent tiles (e.g., pixels in a buffer area) with one weighting increasing and the other weighting decreasing. A weighted average may determine pixel value in the buffer zone of the MCP image. In this way, edges between adjacent tiles may be smoothed, thereby reducing discontinuity.

At 424, method 400 includes outputting for display and saving the MCP image to memory. Following projection of tiles and merged tile pixels as described above, a final object-oriented MCP may be outputted for display on a display device such as display device 142 of FIG. 1. The MCP image may also be saved to memory of the computing device and/or to external memory.

Referring now to FIG. 5, an example of a first image 500 is shown. First image 500 may be a first z-plane image of image data (e.g., a z-stack of images). In the example shown in FIG. 5, first image 500 may have dimensions of 4375×4375 pixels. In other examples, image data may have different dimensions. The first image 500 is divided into a plurality of tiles 506. Each of the plurality of tiles 506 has a defined, uniform size defining a grid of tiles. For example, in the example shown in FIG. 5, each of the plurality of tiles 506 is 875×875 pixels. In other examples, tiles may have different dimensions. Each of the plurality of tiles 506 may belong to a respective sub-z-stack, each tile within a sub-z-stack having the same x,y-coordinates and different z-coordinates. The plurality of tiles 506 may include tiles from each sub-z-plane, including z-planes not shown in first image 500.

Brenner gradient values may be calculated, as described with reference to methods 200, 300, and 400, for each of the plurality of tiles 506. A plurality of Brenner gradient distributions 502 may be generated based on the calculated Brenner gradient values. Each of the plurality of Brenner gradient distributions 502 may correspond to a specified sub-z-stack, Brenner gradient values therein corresponding to tiles of the specified z-stack.

Each of the plurality of Brenner gradient distributions 502 may include a plurality of values 508. A peak 512 may be a highest value among the plurality of values 508. An abscissa 510 of the Brenner gradient distributions 502 may correspond to z-coordinate. Each tile may be distinguished by its sub-z-stack and z-coordinate, the z-coordinate denoting to which z-plane the tile belongs. For example, the peak 512 may correspond to a z-coordinate of 2, indicating that a corresponding tile of the sub-z-stack plotted on Brenner gradient distribution 514 has a z-coordinate of 2. A tile that corresponds to a peak may be considered to have a highest local contrast and in some examples the tile (e.g., pixels of the tile) may be projected to an MCP image.

FIG. 5 further shows a heat map 504 that corresponds to the plurality of Brenner gradient distributions 502. The heat map 504 indicates which z-coordinates are projected for each sub-z-stack. Each sub-z-stack position may show a color or shade specific to the z-coordinate of the projected tile. The heat map 504 may include a heat spectrum 520 and a z-coordinate spectrum 522 (e.g., z-plane spectrum) that are aligned with one another. For example, shades or colors of the heat spectrum 520 may correspond to a z-coordinate on the z-coordinate spectrum 522.

Heat patches 518 may each correspond to one of the Brenner gradient distributions of the plurality of Brenner gradient distributions 502 and thus may also correspond to a sub-z-stack. For example, a first heat patch 524 may correspond to a first Brenner gradient distribution 530 and a second heat patch 526 may correspond to a second Brenner gradient distribution 532. A displayed color or shade of the first heat patch 524 may correspond to a z-coordinate of 2 and a displayed color or shade of the second heat patch 526 may correspond to a z-coordinate of 4, as demonstrated by the heat spectrum 520 and the z-coordinate spectrum 522. In this way, both the plurality of Brenner gradient distributions 502 and the heat map 504 may visually represent which tiles are projected for each sub-z-stack, the Brenner gradient distributions 502 doing so by showing peaks that correspond to z-coordinates and the heat map 504 doing so by assigning colors to sub-z-stack positions that correspond to z-coordinates.

Turning now to FIGS. 6A and 6B, examples of a second image 600 are shown. Second image 600 as shown in FIGS. 6A and 6B is a single z-plane of image data, though it should be understood that the image data (as a z-stack of images) may include a plurality of z-plane images. FIG. 6A specifically shows second image 600 divided into a plurality of uniformly sized tiles 602 (e.g., a grid of tiles). FIG. 6B specifically shows second image 600 segmented into a plurality of structure tiles 606.

Second image 600 may include one or more structures 604, the one or more structures 604 being features of interest, objects, or other targets included in the image data. A segmentation algorithm may be applied to the image data to detect the one or more structures 604 therein. The plurality of structure tiles 606 may be sized and located based on the detected one or more structures 604. In this way, each of the plurality of structure tiles 606 may have different dimensions based on a structure to which each corresponds.

In contrast, the plurality of uniformly sized tiles 602 each have the same dimensions, wherein each z-plane of the image data is divided into a grid of square tiles. Each of the plurality of uniformly sized tiles 602 may include pixels of features of interest (e.g., structures) and/or background, wherein some of the plurality of uniformly sized tiles 602 may include only background pixels. In some instances, a size of each uniformly sized tile may be defined based on a smallest structure within the image data, as previously discussed with respect to method 200.

As discussed with reference to method 300 of FIG. 3, in some examples, image data may be both divided into uniformly sized tiles and segmented to define a plurality of structure tiles. The structure tiles may allow for object-oriented MCP in which a tile in a sub-z-stack of structure tiles that has the best contrast is projected. Background pixels, for example the pixels not included in the plurality of structure tiles 606, may be included in one or more of the plurality of uniformly sized tiles 602, as described above. In an object-oriented MCP, as described with respect to method 300, projection of such background pixels may be based on Brenner gradient distributions and nearest neighbor interpolation of the uniformly sized tiles while projection of pixels of features of interest may be based on Brenner gradient distributions of the plurality of structure tiles 606.

In this way, as discussed previously, higher priority for projection may be placed on structures of interest of the image data. Structures within an imaged sample, such as bio-structures, may be a main object of interest of image data and therefore placing higher priority for projection during aggregation of multiple images of the image data may allow for the bio-structures to be most in focus, corresponding to projecting pixels of structure tiles rather than projecting pixels of uniformly sized tiles.

Referring now to FIG. 7, an example third image 700 is shown. Similar to first image 500 and second image 600, third image 700 is depicted in FIG. 7 as a single z-plane image of a z-stack of image data, though it should be understood that the image data may include a plurality of z-plane images. Also similar to first image 500 and second image 600, the image data of third image 700 may be divided into a plurality of tiles 708. Each of the plurality of tiles 708 may be included in a sub-z-stack, wherein each tile within a sub-z-stack has the same x,y-coordinates but different z-coordinates (e.g., is from a different z-plane). In some examples, the plurality of tiles 708 may include one or more tiles 710 with structure pixels and one or more tiles 712 without structure pixels (e.g., background-only pixels). In other examples, each of the plurality of tiles 708 may have structure pixels.

Similar to heat map 504 of FIG. 5, a first heat map 702 may be generated from the third image 700. For example, a Brenner gradient distribution may be generated for each sub-z-stack based on Brenner gradient values calculated for each tile within each sub-z-stack. A z-coordinate corresponding to a peak Brenner gradient value for each Brenner gradient distribution may be assigned a color or shade within the first heat map 702. Each heat patch of the first heat map 702 may correspond to a sub-z-stack of the image data, wherein x,y coordinates of each heat patch correspond to a respective sub-z-stack.

In examples in which one or more of the plurality of tiles 708 are tiles without structure pixels, such as the one or more tiles 712, heat patches within the first heat map 702 may be depicted with a shade or color that does not correspond to a z-coordinate of the image data. For example, heat patch 714 is depicted in FIG. 7 as white, wherein white does not correspond to a z-coordinate. In some examples, a heat spectrum and a corresponding z-coordinate spectrum may be included with the first heat map 702, similar to as described with respect to FIG. 5.

In some examples, a nearest neighbor interpolation algorithm may be applied when one or more of the tiles have only background pixels, as described in detail with respect to FIG. 2. In such examples, a second heat map 704 may be generated following nearest neighbor interpolation. The second heat map 704 may include one or more heat patches generated by the nearest neighbor interpolation that correspond to heat patches of the first heat map 702. For example, heat patch 716 may correspond to heat patch 714 of the first heat map 702. The shade or color of heat patch 716 may correspond to a shade or color of a neighboring heat patch 718 of the second heat map 704 such that a z-coordinate that corresponds to the heat patch 716 may be the same z-coordinate that corresponds to the neighboring heat patch 718. In this way, each of the heat patches of first heat map 702 that do not correspond to a z-coordinate may correspond to a heat patch in the second heat map 704 that does correspond to a z-coordinate.

Based on the second heat map 704, which incorporates both projected tiles for sub-z-stacks with structures (e.g., based on highest local contrast as determined by Brenner gradient calculations) and interpolated tiles for sub-z-stacks without structures (e.g., based on nearest neighbor interpolation), an MCP image 706 may be generated. In some examples, the MCP image 706 may have intensity discontinuity between adjacent tiles as a result of different focuses of pixels projected from different z-planes. In such examples, a linear blending scheme may be performed to reduce discontinuity, as described with respect to FIGS. 2, 3, and 4.

Referring now to FIG. 8, a schematic depiction of a sub-z-stack 800 is shown. Sub-z-stack 800 may include one or more tiles therein, including first tile 802 and second tile 804, wherein each of the one or more tiles belongs to a different z-plane with a different z-coordinate. An ordinate 810 is shown in FIG. 8 as well, with an arrow pointing in a direction of increased z-coordinates. For example, first tile 802 may correspond to a lower z-coordinate than second tile 804. The ordinate 810 may also indicate which z-coordinate each of the tiles corresponds to, for example the first tile 802 may correspond to a z-coordinate z1 and the second tile 804 may correspond to a z-coordinate z2.

In some examples, multiple structures may be included in the sub-z-stack 800. As an example, a first object 806 is included in the first tile 802 and a second object 808 is included in the second tile 804. In such examples where more than one structure is included in a sub-z-stack, a generated Brenner gradient distribution may include multiple local peak Brenner gradient values. For example, Brenner gradient distribution 812, also shown in FIG. 8, may correspond to the sub-z-stack 800. Each data point in the Brenner gradient distribution 812 may be a Brenner gradient value corresponding to a tile within the sub-z-stack 800.

The Brenner gradient distribution 812, in examples in which the sub-z-stack 800 to which the Brenner gradient distribution 812 corresponds includes more than one tile with an object such as first object 806 and second object 808, may include more than one peak. For example, the Brenner gradient distribution 812 includes a first peak 814 and a second peak 816. An abscissa 820 may indicate to which z-coordinate each of the peaks corresponds. For example, first peak 814 may correspond to z-coordinate z1 and second peak 816 may correspond to z-coordinate z2.

In some examples, each local peak may include a data point corresponding to a Brenner gradient value of the tile that corresponds to the local peak. For example, first peak 814 includes first data point 822 and second peak 816 includes second data point 824. First data point 822 may be a Brenner gradient value of first tile 802 and second data point 824 may be a Brenner gradient value of second tile 804. An ordinate 818 may indicate a Brenner gradient value for each of the data points included in the Brenner gradient distribution 812.

As described with reference to method 400 of FIG. 4, more than one tile of sub-z-stacks with multiple objects, structures, and/or features of interest at different z-coordinates, as indicated by a Brenner gradient distribution with more than one local peak Brenner gradient value, may be indicated for projection. In such examples, a merging scheme may be employed to project pixels from each of the indicated tiles. Various merging schemes are described in detail with respect to method 400. In brief, merging may be accomplished via projection of a pixel of a particular x,y-coordinate with maximum intensity, via projection of a weighted average pixel intensity of a particular x,y-coordinate wherein weighting is based on z-coordinate or Brenner gradient value, or via inclusion of additional z-plane data, as will be described by way of example below with reference to FIG. 9.

Turning now to FIG. 9, a schematic depiction of another sub-z-stack 900 is shown. Similar to sub-z-stack 800 of FIG. 8, sub-z-stack 900 may include one or more tiles therein, including first tile 902, second tile 904, third tile 906, fourth tile 908, and fifth tile 910. Each of the one or more tiles within sub-z-stack 900 may correspond to a different z-plane with a different z-coordinate. An ordinate 916 is shown in FIG. 9 with an arrow pointing in a direction of increasing z-coordinates. For example, a z-coordinate corresponding to first tile 902 may be higher than a z-coordinate corresponding to fifth tile 910. The ordinate 916 may also indicate, in some examples, to which z-coordinate a tile corresponds. For example, first tile 902 may correspond to z-coordinate z1 and third tile 906 may correspond to z-coordinate z2.

In some examples, one or more of the tiles of sub-z-stack 900 may include pixels of an object or structure. For example, a first object 912 may be included in first tile 902 and a second object 914 may be included in third tile 906. In such examples where more than one structure is included in a sub-z-stack, a generated Brenner gradient distribution may include multiple local peaks, similar to as described with reference to FIG. 8. For example, Brenner gradient distribution 918 may correspond to the sub-z-stack 900. Each data point in the Brenner gradient distribution 918 may be a Brenner gradient value corresponding to a tile within the sub-z-stack 900.

The Brenner gradient distribution 918, in examples in which the sub-z-stack 900 to which the Brenner gradient distribution 918 corresponds includes more than one tile with an object such as first object 912 of first tile 902 and second object 914 of third tile 906, may include more than one local peak value. For example, the Brenner gradient distribution 918 includes a first local peak 940 and a second local peak 942. An abscissa 938 may indicate to which z-coordinate each of the peaks corresponds. For example, first local peak 940 may correspond to z-coordinate z1 and second local peak 942 may correspond to z-coordinate z2.

In some examples, each local peak may include a data point corresponding to a Brenner gradient value of the tile that corresponds to the local peak. For example, first local peak 940 includes first data point 924 and second local peak 942 includes second data point 930. First data point 924 may be a Brenner gradient value corresponding to first tile 902 and second data point 930 may be a Brenner gradient value corresponding to third tile 906. Additional data points near first local peak 940 and second local peak 942 may also be shown in Brenner gradient distribution 918, each of the additional data points corresponding to a tile of the sub-z-stack 900. For example, a third data point 926 may correspond to second tile 904 and a fourth data point 932 may correspond to fourth tile 908. An ordinate 936 may indicate a Brenner gradient value for each of the data points included in the Brenner gradient distribution 918.

In some examples, each local peak may have a defined threshold. For example, first local peak 940 has a first threshold 920 and second local peak 942 has a second threshold 922. First threshold 920 and second threshold 922 may each be specific to their respective local peaks such that the first threshold 920 is different than the second threshold 922. As an example, if each threshold is set to 90% of a value of a respective peak, and the value of the first local peak is 10 and the value of the second local peak is 8, the first threshold 920 may have a value of 9 and the second threshold 922 may have a value of 7.2. In other examples, each threshold may be set to a different percentage of a respective local peak.

Each of the first and second thresholds 920, 922 may determine which additional tiles may be included in a merging scheme. For example, the third data point 926 has a value above first threshold 920 while fifth data point 928 has a value below the first threshold 920. A tile to which the third data point 926 corresponds, such as second tile 904, may be included as additional z-plane data while a tile to which the fifth data point 928 corresponds may not be included as additional z-plane data. Similarly, fourth data point 932 and sixth data point 934 may both have Brenner gradient values above the second threshold 922 and respective corresponding tiles, e.g., fourth tile 908 and fifth tile 910, may be included as additional z-plane data.

As described, in some examples in which multiple tiles of a sub-z-stack are merged and projected to a final MCP image, a merging scheme may include additional z-plane data. Inclusion criteria for which additional z-plane data may be included in the merge may be based on thresholds respective to a local peak. In the example provided in FIG. 9, pixels of the fourth tile 908, the fifth tile 910, and the second tile 904 may be the additional z-plane data that meets inclusion criteria given that respective Brenner gradient values for those tiles are above respective thresholds. As an example, the third data point 926 is above threshold 920 and therefore the second tile 904 to which the third data point 926 corresponds may be included as additional z-plane data, but the fifth data point 928 has a Brenner gradient value that is below the threshold 920 and therefore a tile to which the fifth data point 928 corresponds may not be included as additional z-plane data.

The merging scheme that utilizes additional z-plane data may include projecting pixels from a group of pixels with the same x,y-coordinate that has the highest intensity value. For example, of sub-z-stack 900, each of the first, second, third, fourth, and fifth tiles 902, 904, 906, 908, and 910 may be considered by the merging scheme, with the first and third tiles 902, 906 corresponding to respective local peaks and the second, fourth, and fifth tiles 904, 908, and 910 being included as additional z-plane data. Pixels within the sub-z-stack 900 may each have an x-coordinate, a y-coordinate, and a z-coordinate. For each group of pixels with the same x,y-coordinate coordinate but different z-coordinates (e.g., a sub-z-stack of pixels), a pixel of one of the included tiles with a highest intensity value may be projected to a final MCP image. Pixels of tiles not included may not be projected to the final MCP image. In this way, pixels that may be of clinical significance that are not included in a tile corresponding to the local peak may be considered for inclusion in the final MCP image.

Referring now to FIG. 10, an example MCP image 1000 is shown. MCP image 1000 is shown in comparison to a MIP image 1002. MCP image 1000 and MIP image 1002 may both be generated from the same image data, wherein multiple images of the image data are aggregated into a single image. MCP image 1000 may be generated from the image data via any of the methods herein disclosed, including method 200 which describes MCP with background tile determination via nearest neighbor interpolation, method 300 which describes object-oriented MCP, and method 400 which describes multi-plane MCP.

The MIP image 1002 may be generated by a MIP method, wherein each projected pixel has a highest (e.g., maximum) intensity among a respective sub-z-stack of pixels. The MCP methods herein disclosed, in contrast, may project pixels of tiles determined to have a highest local contrast, as determined by Brenner gradient values of individual tiles and Brenner gradient distributions of sub-z-stacks of tiles. As described previously, due to a variety of factors, including object distance during image acquisition, some pixels or groups of pixels of the image data may be less in focus than other pixels or groups of pixels. For background pixels, defocused pixels may have a higher intensity than focused pixels due to blurring or artifact, which may result in a halo effect in a MIP image due to projection of artificially high intensity pixels. The MCP methods herein described may mitigate such a halo effect by selecting tiles of pixels based on local contrast, which may result in projection of the most in focus tile of a sub-z-stack.

A technical effect of the methods and systems disclosed herein is that maximum contrast projected images aggregated from multiple images (e.g., a z-stack of images) may have increased image quality and decreased degradation as compared to standard MIP images. By using local contrast as criteria for which pixels are projected in the MCP image, projection of artificially high intensity pixels, which may occur as a result of defocused pixels or artifact from variable object distances or vibration/movement, respectively, is mitigated. Therefore, image degradation, such as in the form of a halo effect around features of interest, that results from projection of artificially high intensity pixels may be reduced, which in turn increases image quality.

The disclosure also provides support for a method for maximum contrast projection (MCP), comprising: dividing image data into a plurality of tiles and a plurality of sub-z-stacks, wherein the image data comprises a plurality of z-plane images having different z-coordinates and a plurality of the plurality of sub-z-stacks comprise one or more tiles of the plurality of tiles, wherein the one or more tiles of the plurality of the plurality of sub-z-stacks belong to different z-plane images, identifying a respective tile of the plurality of the plurality of sub-z-stacks that has a highest local contrast among the one or more tiles of a respective sub-z-stack, projecting pixels of the respective identified tile of the plurality of the plurality of sub-z-stacks to an MCP image, and outputting the MCP image. In a first example of the method, identifying the respective identified tile of the plurality of the plurality of sub-z-stacks that has the highest local contrast comprises calculating a Brenner gradient value for a plurality of the one or more tiles and generating a Brenner gradient distribution for the plurality of the plurality of sub-z-stacks, wherein a peak Brenner gradient value of a respective Brenner gradient distribution corresponds to the respective identified tile. In a second example of the method, optionally including the first example, the method further comprises: applying a nearest neighbor interpolation algorithm to sub-z-stacks corresponding to Brenner gradient distributions without a peak value. In a third example of the method, optionally including one or both of the first and second examples, the plurality of tiles are uniformly sized and comprise a grid. In a fourth example of the method, optionally including one or more or each of the first through third examples, the method further comprises: detecting one or more structures of interest within the image data and segmenting the image data to define one or more structure tiles of one or more structure sub-z-stacks. In a fifth example of the method, optionally including one or more or each of the first through fourth examples, the method further comprises: identifying a structure tile of the one or more structure tiles of each of the one or more structure sub-z-stacks that has a highest local contrast. In a sixth example of the method, optionally including one or more or each of the first through fifth examples, identifying the identified structure tile comprises calculating a Brenner gradient value of each of the one or more structure tiles of a plurality of the one or more structure sub-z-stacks and generating a Brenner gradient distribution for the plurality of the one or more structure sub-z-stacks, wherein each identified structure tile corresponds to a peak Brenner gradient value of each Brenner gradient distribution. In a seventh example of the method, optionally including one or more or each of the first through sixth examples, the method further comprises: projecting pixels of each identified structure tile to the MCP image. In an eighth example of the method, optionally including one or more or each of the first through seventh examples, one or more Brenner gradient distributions comprises more than one local peak value and pixels of tiles corresponding to the more than one local peak value are merged and projected to the MCP image. The disclosure also provides support for a system, comprising: an imager configured to acquire images of a sample, a computing device including a processor communicatively coupled to the imager, wherein the computing device is configured to execute instructions stored in non-transitory memory that, when executed, cause the processor to: obtain image data of the sample, wherein the image data comprises a z-stack of z-plane images, partition the image data into a plurality of uniformly sized tiles, wherein each of a plurality of sub-z-stacks comprises one or more tiles of the plurality of uniformly sized tiles, calculate a Brenner gradient value for each of the plurality of uniformly sized tiles, generate a Brenner gradient distribution for each of the plurality of sub-z-stacks, project pixels of tiles corresponding to a peak Brenner gradient value for each Brenner gradient distribution to a maximum contrast projection (MCP) image, output the MCP image for display on a display device communicatively coupled to the computing device, and save the MCP image to memory. In a first example of the system, the system is configured as a wide-field microscopy system. In a second example of the system, optionally including the first example, a tile corresponding to the peak Brenner gradient value for each Brenner gradient distribution has a highest local contrast of each corresponding sub-z-stack. In a third example of the system, optionally including one or both of the first and second examples, the system further comprises: applying a linear blending scheme to adjacent projected tiles of the MCP image. In a fourth example of the system, optionally including one or more or each of the first through third examples, the system further comprises: segmenting the image data to define one or more structure tiles and one or more sub-z-stacks of structure tiles, identifying a structure tile for each sub-z-stack of structure tiles that has a highest local contrast, and projecting pixels of the identified structure tile to the MCP image, wherein projecting pixels of the identified structure tile comprises replacing projected pixels corresponding to peak Brenner gradient values for each Brenner gradient distribution. The disclosure also provides support for a method, comprising: dividing image data into a grid of tiles and a set of sub-z-stacks, wherein each sub-z-stack of the set of sub-z-stacks comprises a tile of the grid of tiles for each z-plane of the image data, generating Brenner gradient distributions for each of the set of sub-z-stacks, projecting pixels of tiles corresponding to a peak Brenner gradient value of each Brenner gradient distribution with a single peak to generate a maximum contrast projection (MCP) image, and outputting the MCP image for display. In a first example of the method, the method further comprises: merging pixels of tiles corresponding to local peak Brenner gradient values of each Brenner gradient distribution with more than one local peak Brenner gradient value. In a second example of the method, optionally including the first example, merging pixels of tiles corresponding to local peak Brenner gradient values comprises taking a pixel from one of the tiles corresponding to local peak Brenner gradient values with a highest pixel intensity value for each x,y-coordinate of a corresponding sub-z-stack. In a third example of the method, optionally including one or both of the first and second examples, merging pixels of tiles corresponding to local peak Brenner gradient values comprises determining a weighted average pixel intensity, wherein weighting is based on one of a z-coordinate of tiles corresponding to local peak Brenner gradient values and the local peak Brenner gradient values of the tiles corresponding to the local peak Brenner gradient values. In a fourth example of the method, optionally including one or more or each of the first through third examples, merging pixels of tiles corresponding to local peak Brenner gradient values comprises taking a pixel from tiles with a Brenner gradient value above a threshold, wherein the pixel taken has a highest pixel intensity value and wherein the threshold is specific to a respective local peak. In a fifth example of the method, optionally including one or more or each of the first through fourth examples, the method further comprises: blending adjacent projected tiles of the MCP image via a linear blending scheme.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for maximum contrast projection (MCP), comprising:

dividing image data into a plurality of tiles and a plurality of sub-z-stacks, wherein each tile of the plurality of tiles having the same x,y-coordinates belongs to a respective sub-z-stack of the plurality of sub-z-stacks, wherein the image data comprises a plurality of z-plane images having different z-coordinates and a plurality of the plurality of sub-z-stacks comprise one or more tiles of the plurality of tiles, wherein the one or more tiles of the plurality of the plurality of sub-z-stacks belong to different z-plane images;

identifying a respective tile of the plurality of the plurality of sub-z-stacks that has a highest local contrast among the one or more tiles of a respective sub-z-stack, wherein identifying the respective identified tile of the plurality of the plurality of sub-z-stacks that has the highest local contrast comprises calculating a Brenner gradient value for a plurality of the one or more tiles and generating a Brenner gradient distribution for the plurality of the plurality of sub-z-stacks, wherein a peak Brenner gradient value of a respective Brenner gradient distribution corresponds to the respective identified tile, and wherein one or more Brenner gradient distributions comprises more than one local peak value and pixels of tiles corresponding to the more than one local peak value are merged and projected to the MCP image;

projecting pixels of the respective identified tile of the plurality of the plurality of sub-z-stacks to an MCP image; and outputting the MCP image.

2. The method of claim 1, further comprising applying a nearest neighbor interpolation algorithm to sub-z-stacks corresponding to Brenner gradient distributions without a peak value.

3. The method of claim 1, wherein the plurality of tiles are uniformly sized and comprise a grid.

4. The method of claim 1, further comprising detecting one or more structures of interest within the image data and segmenting the image data to define one or more structure tiles of one or more structure sub-z-stacks.

5. The method of claim 4, further comprising identifying a structure tile of the one or more structure tiles of each of the one or more structure sub-z-stacks that has a highest local contrast.

6. The method of claim 5, wherein identifying the identified structure tile comprises calculating a Brenner gradient value of each of the one or more structure tiles of a plurality of the one or more structure sub-z-stacks and generating a Brenner gradient distribution for the plurality of the one or more structure sub-z-stacks, wherein each identified structure tile corresponds to a peak Brenner gradient value of each Brenner gradient distribution.

7. The method of claim 5, further comprising projecting pixels of each identified structure tile to the MCP image.

8. A system, comprising:

an imager configured to acquire images of a sample;

a computing device including a processor communicatively coupled to the imager, wherein the computing device is configured to execute instructions stored in non-transitory memory that, when executed, cause the processor to:

obtain image data of the sample, wherein the image data comprises a z-stack of z-plane images;

partition the image data into a plurality of uniformly sized tiles comprising a grid, wherein a size of the uniformly sized tiles is predefined based on a smallest feature of interest within the image data, wherein each of a plurality of sub-z-stacks comprises one or more tiles of the plurality of uniformly sized tiles, wherein tiles of the plurality of uniformly sized tiles having the same x,y-coordinates each belong to a respective sub-z-stack, the respective sub-z-stack comprising each tile with specified x,y-coordinates;

calculate a Brenner gradient value for each of the plurality of uniformly sized tiles;

generate a Brenner gradient distribution for each of the plurality of sub-z-stacks;

project pixels of tiles corresponding to a peak Brenner gradient value for each Brenner gradient distribution to a maximum contrast projection (MCP) image;

output the MCP image for display on a display device communicatively coupled to the computing device; and save the MCP image to memory.

9. The system of claim 8, wherein the system is configured as a wide-field microscopy system.

10. The system of claim 8, wherein a tile corresponding to the peak Brenner gradient value for each Brenner gradient distribution has a highest local contrast of each corresponding sub-z-stack.

11. The system of claim 8, further comprising applying a linear blending scheme to adjacent projected tiles of the MCP image.

12. The system of claim 8, further comprising segmenting the image data to define one or more structure tiles and one or more sub-z-stacks of structure tiles, identifying a structure tile for each sub-z-stack of structure tiles that has a highest local contrast, and projecting pixels of the identified structure tile to the MCP image, wherein projecting pixels of the identified structure tile comprises replacing projected pixels corresponding to peak Brenner gradient values for each Brenner gradient distribution.

13. A method, comprising:

dividing image data into a grid of tiles and a set of sub-z-stacks, wherein each sub-z-stack of the set of sub-z-stacks comprises a tile of the grid of tiles for each z-plane of the image data;

generating Brenner gradient distributions for each of the set of sub-z-stacks;

projecting pixels of tiles corresponding to a peak Brenner gradient value of each Brenner gradient distribution with a single peak to generate a maximum contrast projection (MCP) image;

merging pixels of tiles corresponding to local peak Brenner gradient values of each Brenner gradient distribution with more than one local peak Brenner gradient value; and outputting the MCP image for display.

14. The method of claim 13, wherein merging pixels of tiles corresponding to local peak Brenner gradient values comprises taking a pixel from one of the tiles corresponding to local peak Brenner gradient values with a highest pixel intensity value for each x,y-coordinate of a corresponding sub-z-stack.

15. The method of claim 13, wherein merging pixels of tiles corresponding to local peak Brenner gradient values comprises determining a weighted average pixel intensity, wherein weighting is based on one of a z-coordinate of tiles corresponding to local peak Brenner gradient values and the local peak Brenner gradient values of the tiles corresponding to the local peak Brenner gradient values.

16. The method of claim 13, wherein merging pixels of tiles corresponding to local peak Brenner gradient values comprises taking a pixel from tiles with a Brenner gradient value above a threshold, wherein the pixel taken has a highest pixel intensity value and wherein the threshold is specific to a respective local peak.

17. The method of claim 13, further comprising blending adjacent projected tiles of the MCP image via a linear blending scheme.

* * * * *